(12) United States Patent
Erikawa et al.

(10) Patent No.: US 6,736,724 B1
(45) Date of Patent: May 18, 2004

(54) CHARACTER GROUP BATTLE METHOD, RECORDING MEDIUM AND GAME DEVICE

(75) Inventors: Yoichi Erikawa, Yokohama (JP); Jumpei Tsuda, Yokohama (JP)

(73) Assignee: Koei Co., Ltd., Yokohama (JP)

( * ) Notice: Subject to any disclaimer, the term of this patent is extended or adjusted under 35 U.S.C. 154(b) by 0 days.

(21) Appl. No.: 09/721,886

(22) Filed: Nov. 24, 2000

(30) Foreign Application Priority Data

Nov. 30, 1999 (JP) .......................................... 11-339176

(51) Int. Cl.[7] ................................................ A63F 13/00
(52) U.S. Cl. ............................... 463/7; 463/23; 463/32; 463/1
(58) Field of Search .................... 463/30–32, 9, 463/33, 6, 23, 7–8; 434/14

(56) References Cited

U.S. PATENT DOCUMENTS 6,267,674 B1 * 7/2001 Kondo et al. .................. 463/32

OTHER PUBLICATIONS

User Manual, "Age of Rifles 1846–1905". Published by Strategic Simulations, Inc. 1996, pp. 14, 28, 31–34 and 38.*
"The Civil War, A Narrative: Fort Sumter to Perryvile"; Foote, Shelby; First Vintage Books Edition, Copyright 1958, pps 81 and List of Maps.*
User Maual, "Age of Rifles 1846–1905". Published by Strategic Simulations, Inc. 1996, pp. 15–16, 39–40 and Back Page of Cover of Game.*
Wilhelms, J., et al., "Dynamic animation: interacton and control", *Visual Computer*, 4:283 –295 (1988).
*Computer Graphics, Principles and Practice*, Foley, J.D., et al., 2nd ed., Addison–Wesley Publishing Company, Inc., pp. 488–491 (copyright 1990, reprinted with corrections Nov. 1992 & Nov. 1993).

* cited by examiner

*Primary Examiner*—Mark Sager
*Assistant Examiner*—Aaron Capron
(74) *Attorney, Agent, or Firm*—Wean Khing Wong

(57) ABSTRACT

A character-group battle method, recording medium and game device for realistically expressing a group battle through a series of operations are provided. It is determined whether or not there is an enemy horse soldier belonging to an enemy army inside the enemy-search area that has been preset as the range of view of the object horse soldier (S406), and when it is determined that there is an enemy horse soldier (S410, 416, 428), then it is determined whether or not that enemy horse soldier is capable of engaging in battle with the object horse soldier, and when it is determined that battle is possible, then that enemy horse soldier is identified as an enemy that the object horse soldier must do battle (S440), so the object horse soldier approaches the enemy horse soldier until the enemy horse soldier is inside the battle area of the object horse soldier.

18 Claims, 34 Drawing Sheets

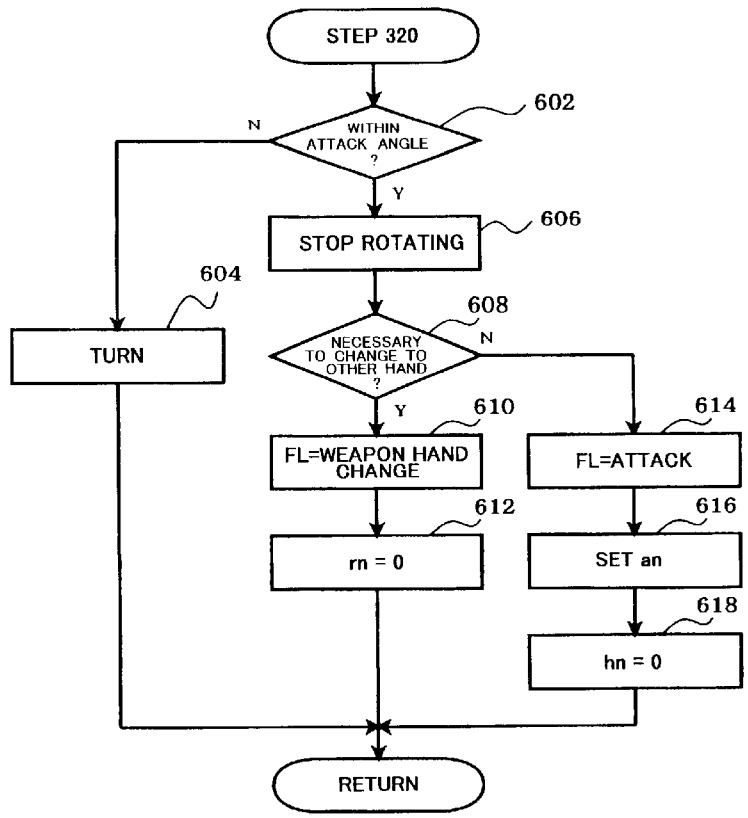

Fig. 39
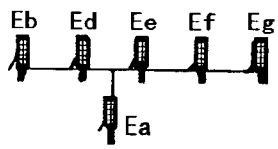
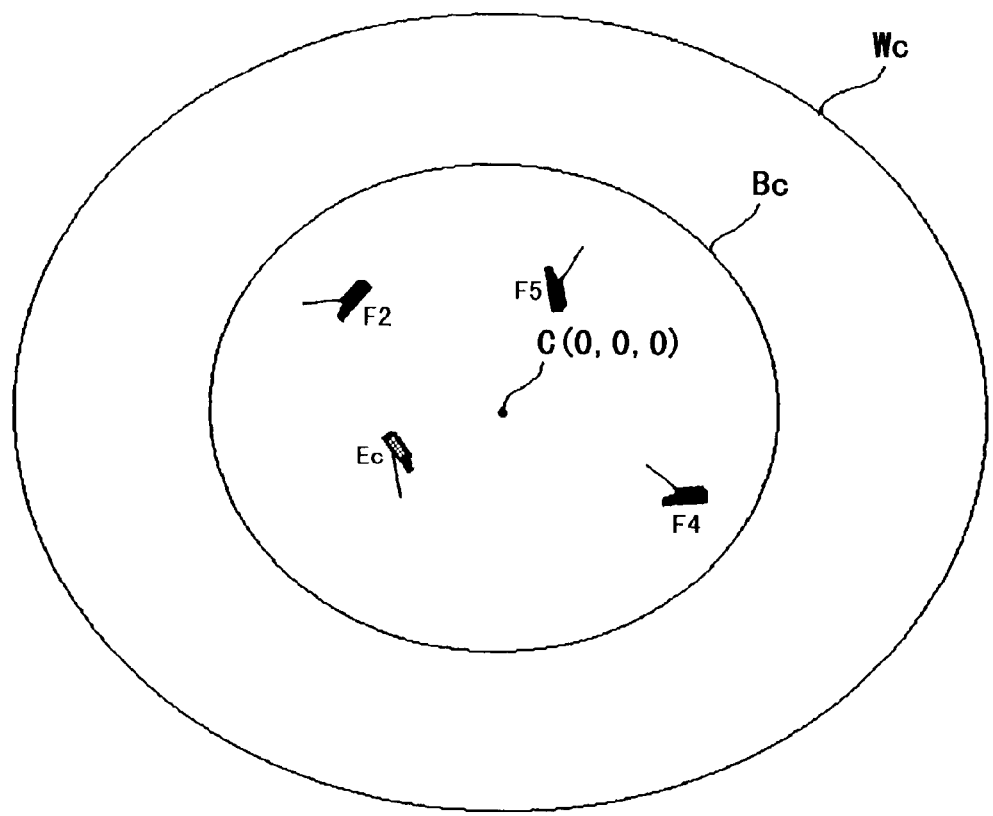
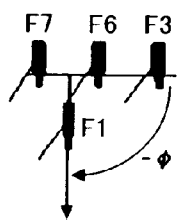

Fig. 40A

| LOCKED Eb | LOCKING |
|---|---|
| | |

Fig. 40B

| LOCKED | LOCKING Eb |
|---|---|
| | |

Fig. 40C

| LOCKED | LOCKING |
|---|---|
| | |

Fig. 40D

| LOCKED | LOCKING Ec |
|---|---|
| | |

Fig. 40E

| LOCKED | LOCKING | CLEAR Ec |
|---|---|---|
| | | |

Fig. 41A
| No. | ENEMY | ENEMY'S POSITION |
|---|---|---|
| 1. | Ea | (xa, ya, za) |
| 2. | Ec | (xc, yc, zc) |
| 3. | Ef | (xf, yf, zf) |
| 4. | Eg | (xg, yg, zg) |
Fig. 41B
| No. | ENEMY |
|---|---|
| 1. | Ea |
| 2. | Eg |
| 3. | Ef |
| 4. | Ec |
Fig. 41C
| No. | ENEMY | STATUS FLAG |
|---|---|---|
| 1. | Ea | APPROACH |
| 2. | Eg | DEAD |
| 3. | Ef | CONFRONTATION |
| 4. | Ec | WANDERING ENEMY-SEARCH |
Fig. 42A
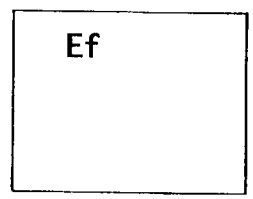
Fig. 42B
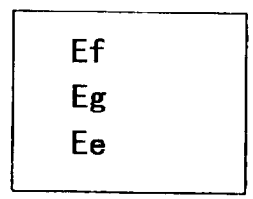

CHARACTER GROUP BATTLE METHOD, RECORDING MEDIUM AND GAME DEVICE

This patent application claims priority under 35 USC §119, under the Paris Convention, of Japanese Patent Application Number 11-339176, filed Nov. 30, 1999, the disclosure of which is expressly incorporated by reference herein in its entirety.

BACKGROUND OF THE INVENTION

1. Field of the Invention

This invention relates to a group battle method, as well as to a recording medium and game device, and more particularly to a character group battle method in which a plurality of characters, that are displayed in a 3-dimensional virtual space, form groups of friends and enemies that battle against one another, as well as to a computer readable recording medium and game device capable of storing the game program in its memory.

2. Description of the Related Art

Recently, there are various kinds of game software sold by various companies that are recorded on a recording medium such as CD-ROM. This kind of recording medium is used by inserting it into a game device. As shown in FIG. 1, the most typical kind of home-use game device 10 comprises an input device 3, such as the controller pad shown in FIG. 2, and a TV monitor 4 which are connected to the main game unit 2. When the player inserts the recording medium 1 into the main game unit 2, the game program that is recorded on the recording medium 1 is loaded to the RAM of the main game unit 2 automatically, and the game starts by pressing a certain button on the input device 3. Then it is possible to play the game by operating buttons on the input device 3.

Conventionally, battle games in which the characters were mainly divided up into friend or enemy using 2-dimensional coordinates, have been sold. For example, there is the game, 'Bokosuka Wars', sold by Ascii Co. in 1985 for a family computer (Nintendo Co.), where the player's rank rises each time a friendly soldier wins a battle, or the game, 'Napoleon's Journal', sold by Irem Co. in 1988, in which the player selects the direction for each unit to move in, then when a friendly unit encounters an enemy, the player selects a formation from among some selectable formations. Also, there are games such as the game, 'Silver Ghost', that was sold by Kure Software Co. in 1988 for a computer (for NEC, PC-88X1), in which the player controls the characters and help a character directly when caught in a pinch.

For game software like these, the game does not wait for command input by the player during a battle, but the game continues on and battles are repeated in real-time even when a command is being input. These kinds of games are called 'Real-time Simulation Games'. Real-time simulation games belong to the genre of games in which the enemy army is attacked and defeated while considering tactics. They differ from 'Turn-format' game in which command input from the player is received after a set amount of time, and in which the enemy does not attack during command input. In real-time simulation games, the enemy constantly attacks, so it is possible to experience the tension and tactics of a real battle.

The related literature includes the April 1988 issue of "The Visual Computer," in which the equation of motion based on Euler's method is described under "2.2 Numerical integration methods" of "Dynamic animation: interaction and control" (pp. 283–295; Jane Wilhelms, Matthew Moore, and Robert Skinner).

However, in conventional real-time simulation games, since the game is mainly a 2-dimensional battle, it is not possible to express the power of an actual battle, and there was a need for better visibility. Also, with the rapid advance of current computer technology, it is possible to display images on the screen of the TV monitor 4 that are equal to that of movies, however with the conventional technology there was the problem that games did not have the realistic feeling that players desire.

Moreover, in the real-time simulation games described above, were only thinking-type games in which strategy is used, such as games in which when the leader moves one step forward, the other characters follow by one step, and when a friendly character comes in contact with an obstacle on the way, it becomes impossible for that character to advance, or games in which the characters do not search out the enemy automatically, but when a character comes in contact with an enemy along the way, a battle begins. There was a problem in that there was no feeling of an actual battle in which the characters would search out the enemy on their own (enemy search), or the state of movement changes depending on conditions.

SUMMARY OF THE INVENTION

In consideration of the problems described above, the object of this invention is to provide a character group battle method, recording medium and game device which is capable of realistically expressing a series of operations of a group battle.

In order to accomplish the above object, a first aspect of the present invention is a character-group battle method in which a plurality of characters, that are displayed in a 3-dimensional virtual space, form groups of friends and enemies that battle against one another, comprising: an enemy search step of determining whether there is an enemy character of the enemy group within a first area that is predetermined as the range of vision of the character, and when it is determined that there is the enemy character, determines whether it is possible for the enemy character to battle with the character, and when it is determined that battle is possible, identifies the enemy character as an enemy that the character should battle with; and an approach step of moving the character until the enemy character is inside a second area that is predetermined as the battle range of the character.

In this aspect, in the enemy search step of determining whether there is an enemy character of the enemy group within a first area that is predetermined as the range of vision of the character, and it is determined that there is an enemy character, it then determines whether it is possible for the enemy character to battle with the character, and when it is determined that battle is possible, it identifies the enemy character as an enemy that the character should battle, and in the approach step, the character is moved inside a second area near the enemy character that is predetermined as the battle range of the character. Since, each character finds enemy characters within its own range of vision and approaches the enemy, it is possible to more realistically express battle between groups of characters.

In this case, in the enemy search step, when it is determined that there is no enemy character or when it is determined that battle is not possible, by moving the 3-dimensional virtual space in a movement mode that is different than the movement mode of the enemy-search step such that it possible for the character to find an enemy, the movement mode changes, which attracts the attention of the player, while at the same time, the range of vision changes according to the movement mode and makes it easier to find an enemy character and to perform matching in a short amount of time, and thus it is possible to prevent the player from becoming frustrated during the time until matching is complete. Circling movement may be used for the different movement.

Moreover, by determining whether battle is possible based on predetermined battle conditions for allowing one-on-one (1:1) or one-on-several (1:several) battles between the friend and enemy characters, battle between friend and enemy characters occurs under battle conditions set by the player, and thus a method of battle that is more similar to actual battle is possible.

Furthermore, when there is an obstacle between the character and enemy character that hinders the character from approaching near the enemy character, by canceling the approach step and having the character search out another enemy character in the enemy search step, it is possible for the blocked character that could not approach the enemy character, to search out and approach another enemy character, so it is possible to prevent the player from losing interest.

Furthermore, by including a battle step of stopping the character after approaching the enemy character within the second area, then changing the direction of the character such that it is capable of battle with the enemy character, it is possible for a pair of characters to battle even when battle is difficult, such as when battling head on as in the case of a pair of horse soldiers. In this case, when the character receives a predetermined amount of damage from the enemy character, or when the character is inside the second area of a different enemy soldier that the characters identifies as an enemy and the different enemy character is outside the second area of the character, by canceling the battle step and including an escape step of escaping from battle with the enemy character and/or the different enemy character, it is possible to escape from the enemy, making it possible for the player to enjoy even more realistic battles. At this time, if the character threatens the enemy character and/or the different enemy character before the escape, and the enemy character and/or the different enemy character recoil(s) by the threatening of the character, the player can enjoy battles more.

A second aspect of the present invention is a computer-readable recording medium on which the character-group battle method of the first aspect is recorded. And, a third aspect of the present invention is a game device that is capable of storing in memory character-group battle program in which a plurality of characters, that are displayed in a 3-dimensional virtual space, form groups of friends and enemies that battle against one another, comprising: enemy search unit for determining whether there is an enemy character of the enemy group within a first area that is predetermined as the range of vision of the character, and when it is determined that there is the enemy character, determines whether it is possible for the enemy character to battle with the character, and when it is determined that battle is possible, identifies the enemy character as an enemy that the character should battle with; and approach unit for moving the character until the enemy character is inside a second area that is predetermined as the battle range of the character. The present invention will made more clear with reference to the preferred embodiments described below.

BRIEF DESCRIPTION OF THE DRAWINGS

FIG. 15 is a flowchart showing the details of the turn process sub-routine of step 320 of the battlefield process sub-routine.

FIG. 16 is a flowchart showing the details of the weapon hand change process sub-routine of step 324 of the battlefield process sub-routine.

FIG. 39 is a drawing explaining the troop line up at the fall-in position after the withdraw command has been given.

FIGS. 40A to 40D are drawings explaining the data entered in the unlock and lock sections for lock data.

FIG. 40E is a drawing explaining the data entered in the delete section for lock data.

FIG. 41A is a list of position data and data that identifies enemy horse soldiers inside the enemy-search area of the object horse soldier.

FIG. 41B is a list of data that identifies enemy horse soldiers in order from the closest to the object horse soldier.

FIG. 41C shows enemy-search index data in a list of read status flags for the enemy horse soldiers.

FIG. 42A is a list of enemy horse soldiers of the object horse soldier when the enemy horse soldier that enters the battle area of the object horse soldier.

FIG. 42B is a drawing explaining the state when another enemy horse soldier is added to the enemy list.

DESCRIPTION OF THE PREFERRED EMBODIMENTS

The preferred embodiment of the video game to which the invention is applied is explained below with reference to the drawings. In this embodiment, the group of characters is a horse army made up of horse soldiers, and after lining up at a preset location, the armies move forward to the battlefield where a battle takes place with the enemy horse soldiers of the enemy army.

(Configuration)

Figure 3:
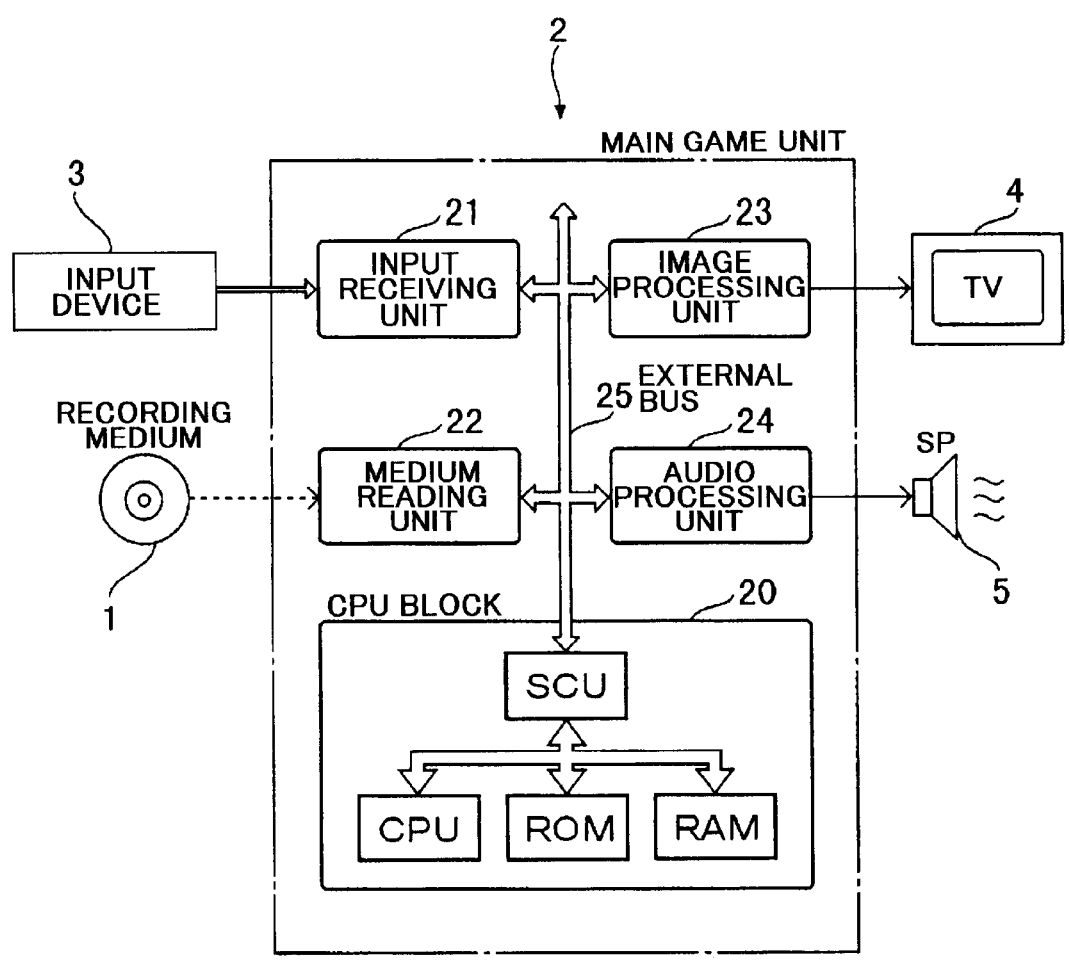
FIG. 3 is a simplified block diagram showing the configuration of the main game unit of an embodiment of the invention.

As shown in FIG. 3, the main game unit 2 comprises a CPU block 20 that controls the entire device. The CPU block 20 comprises a system control unit (SCU) that mainly controls data transfer between the components inside the main game unit 2, a CPU which is the central processing unit and which works at the high-speed clock, ROM in which the basic control operations for the main game unit 2 are stored, RAM which functions as the work area for the CPU and which temporarily stores the game program and various data that are recorded on the recording medium 1, and an internal bus for connecting the components.

The SCU 20 is connected to an external bus 25. The external bus 25 is connected to: an input receiving unit 21, that receives input from the input device 3, such as a control pad, and transfers the input data to the CPU block; a medium reading unit 22, such as a CD-ROM drive, which comprises a sub CPU (not shown in the figure) and that reads the game program which is recorded on the recording medium 1 and transfers it to the CPU block 20; an image processing unit 23, which comprises a sub CPU (not shown in the figure) and VRAM and which produces an image according to the data transferred from the CPU block 20; and an audio processing unit 24, which comprises a sub CPU (not shown in the figure), and which processes sound such as background music, or galloping sounds of the horse soldiers, etc. In addition, the input receiving unit 21 is connected to the input device 3, the image processing unit 23 is connected to the TV monitor 4, and the audio processing unit 24 is connection the a speaker 5 inside the TV monitor 4.

(Operation)

Next, the operation of the video game device of this embodiment will be explained with reference to the flowcharts, when there is a battle between a horse soldier of the player's army (called army F below), and a horse soldier of the computer's army (called army E below). After the power supply is connected to the main game unit 2 and the power switch (not shown in the figure) is pressed to start operation of the main game unit 2, execution of the enemy-search and battle routine, shown in FIG. 4, begins.

Figure 1:
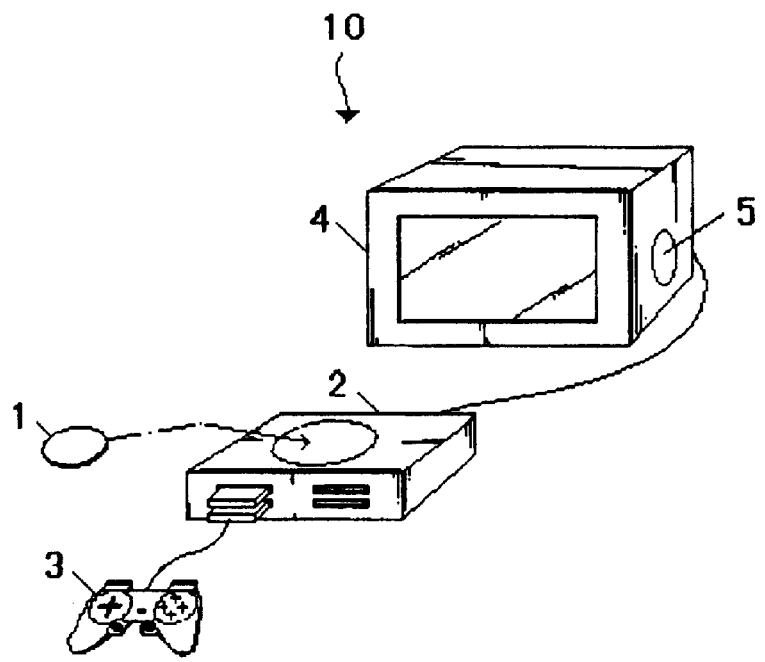
FIG. 1 is a simplified perspective view of the setup of a home-use game device.
Figure 2:
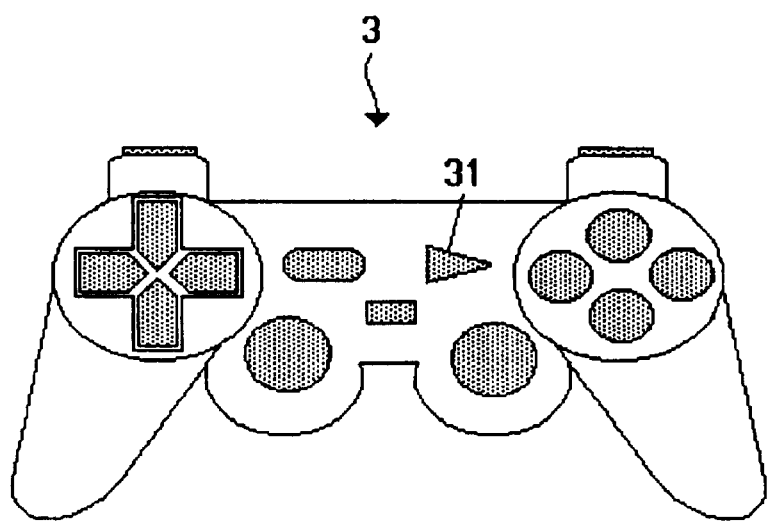
FIG. 2 is a plan view of the input device that is used with the home-use game device.

In the enemy-search and battle routine, first, in step 102, the recording medium 1 is inserted into the medium reading unit 22, and waits for it to become possible to read the game program. Next, in step 104, after it becomes possible to read the program, the game program is read by the medium reading unit 22, and the read game program is transferred to RAM. Then, in step 106, the process waits until the start button 31 of the input device 3 (see FIG. 2) is pressed. After the start button 31 is pressed, then in step 108, the initial setup process sub-routine is executed in order for battle engagement between army F and army E.

Figure 5:
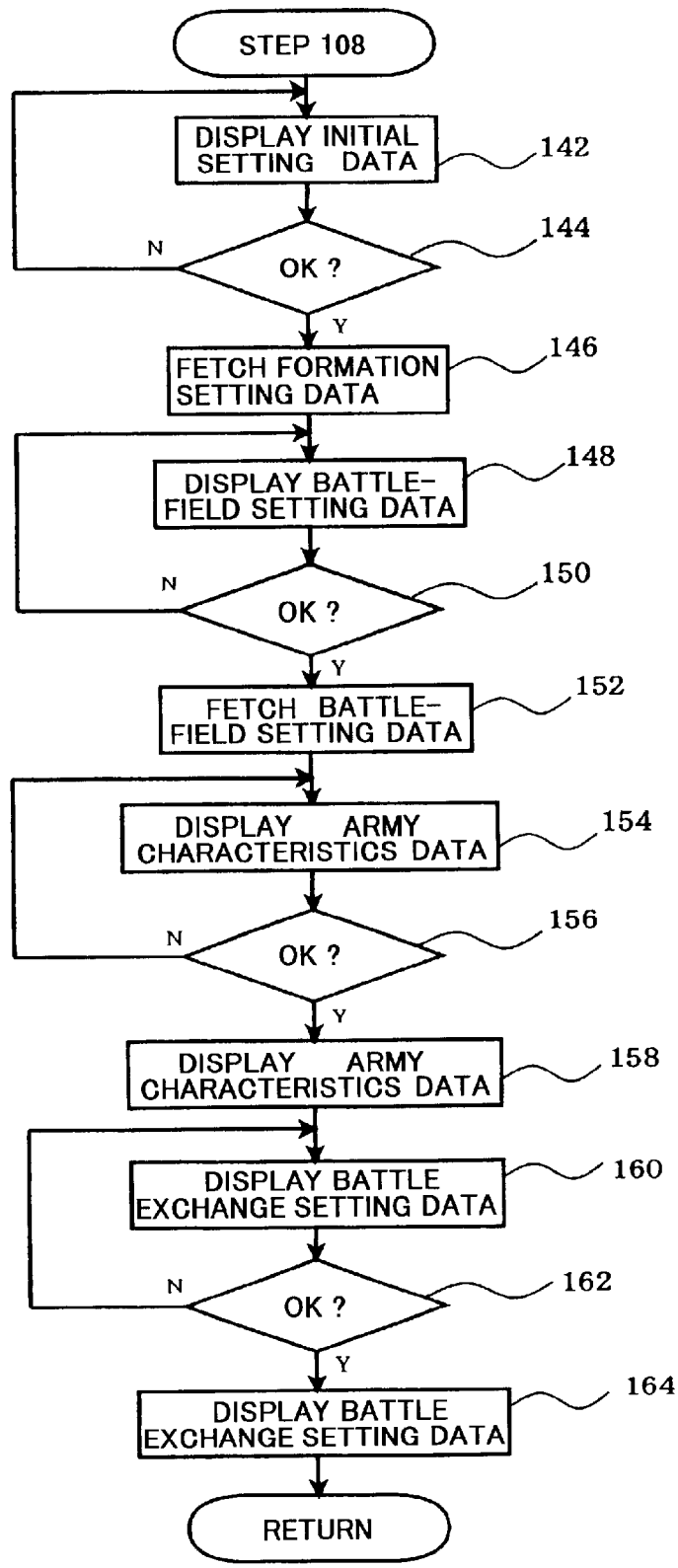
FIG. 5 is a flowchart showing the details of the initial setup process sub-routine of step 108 of the enemy-search and battle routine.
Figure 28:
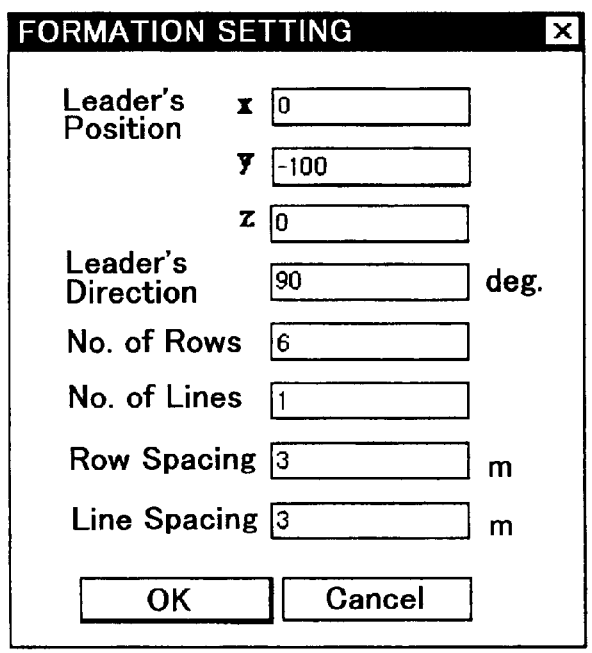
FIG. 28 is a dialog screen for the formation setting data displayed on the TV monitor.

As shown in FIG. 5, in this initial setup process sub-routine, first, in step 142, the formation of army F is set, and the formation setting data for lining up at the line-up point are displayed on the TV monitor 4. In the display of this formation setting data, the default values that were stored in RAM in step 104 are displayed in dialog format as shown in FIG. 28. As shown in FIG. 32, when the 'Leader's Position' is displayed in coordinates (0, 0, 0) of a 3-dimensional virtual space as the center C of the battlefield in FIG. 28 (see FIG. 29), the position (coordinates) of the leader F1 of army F (called leader below) in the 3-dimensional virtual space is displayed, the 'Leader's Direction' is displayed as the angle of the leader's face from the horizontal line (or horizontal surface) HL in the 3-dimensional virtual space of the leader F1, the 'No. of Lines' and 'No. of Rows' are displayed as the number of lines and rows when the horse soldiers, except the leader, of army F are lined up, and the 'Line Spacing' and 'Row Spacing' are displayed as the space between lines and rows of horse soldiers in the 3-dimensional virtual space. Moreover, it is possible for the player to change the default values as desired with the input device 3. Also, in FIG. 28, when the button on the input device 3 that corresponds to 'Cancel' is pressed, the changed values return to the default values (this is the same in FIGS. 29 to 31). In this embodiment of the invention, it is possible to specify with the input device 3 that the leader F1 be automatically set.

In step 144 in FIG. 5, the process waits until the player performs the button controls shown in FIG. 28 with the input device 3 for pressing the 'OK' button, then when the button controls are performed, in the next step 146, the formation settings for army F are received and stored in RAM, after which the formation settings for army E are calculated and stored in RAM. When calculating the formation settings for army E, as shown in FIG. 32, army F and army E are symmetrically located across from the center C of the battlefield, and the position of the leader Ea of army E is calculated based on the position and direction of the leader F1 of army F, and the values for the number of lines and rows and the spacing for the lines and rows are copied as are from the formation settings of army F shown in FIG. 28.

Figure 29:
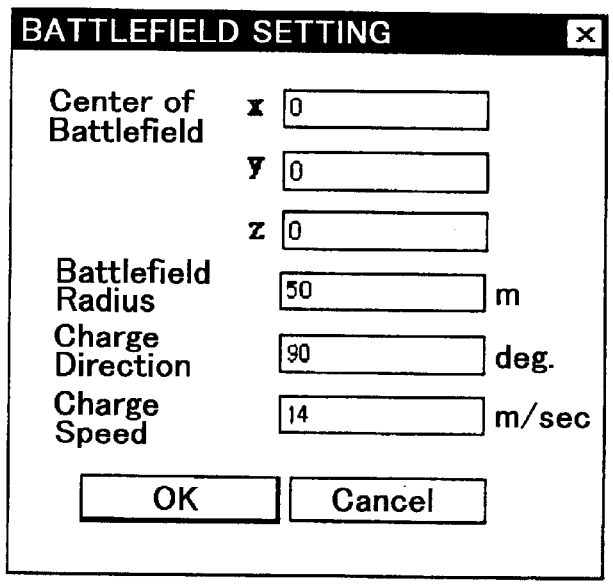
FIG. 29 is a dialog screen for the battlefield setting data displayed on the TV monitor.

Next, in step 148, the battlefield setting data for the battlefield of battle between both armies are displayed on the TV monitor 4. The display of the battlefield setting data, displays the default values that were stored in RAM in step 104 in dialog format as shown in FIG. 29. As shown in FIG. 32, the 'Charge Direction' in FIG. 29 is displayed as the direction from the leader F1 to the center C of the battlefield, and the 'Charge Speed' is displayed as the speed of the horse soldiers of army F on the 3-dimensional virtual space while charging. Moreover, the battlefield where the horse soldiers of both armies mainly engage in battle is circle (or sphere) Bc with a center at the center C of the battlefield and a battlefield radius $R_B$.

In the next step 150, the process waits for specified button controls to be performed, and when those button controls are performed, then in step 152, the battlefield settings are obtained and stored in RAM, after which the charge direction for army E is calculated, and the charge speed of army F is copied as the charge speed of army E and these values are stored in RAM.

Figure 30:
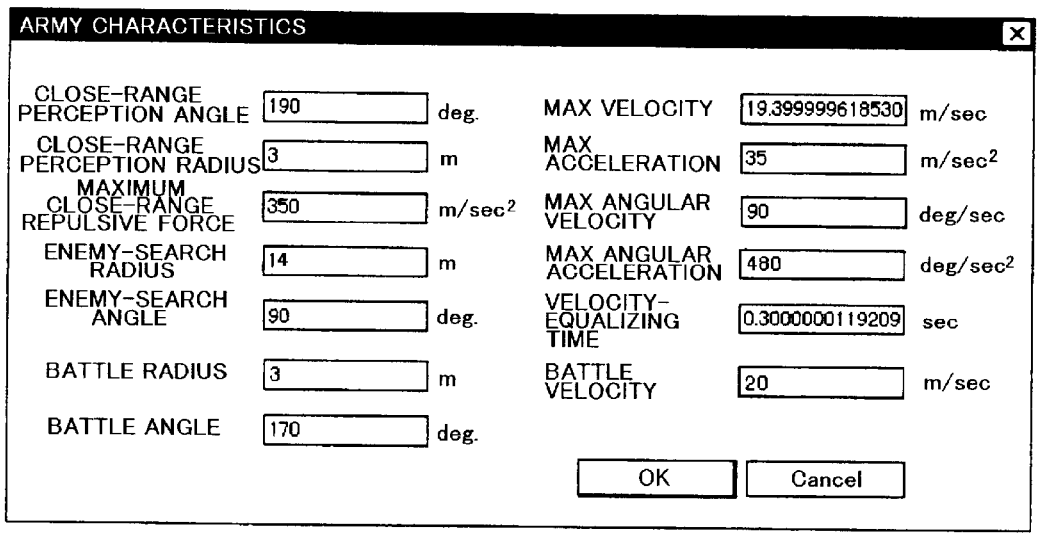
FIG. 30 is a dialog screen for the army characteristic data displayed on the TV monitor.

Next, in step 154, the army characteristics data for the horse soldiers of army F are displayed on the TV monitor. As shown in FIG. 30, the army characteristics data are the default values stored in RAM in step 104 and displayed in dialog format. The army characteristics data can be changed. The meanings of the 'Close-range Perception Angle' and the like, shown in FIG. 30, will be explained later. In the next step 156, the process waits for prescribed button control to be performed, and after the button controls have been performed, the army characteristics data are obtained and stored in RAM in step 158. Values that are identical to the army characteristics data for army F are used as the army characteristics data for army E.

Next, in step 160, the battle exchange setting data, that sets whether horse soldiers will battle one-on-one (1:1) or one-on-several, are displayed on the TV monitor 4. In the default values shown in FIG. 31, the time of execution described later (see step 112 in FIG. 4) is taken to be the reference, and only one-on-one battle is allowed for the first five minutes, one-on-one or one-on-two battle is allowed after the first five minutes up to ten minutes, and after ten minutes, one-on-one (1:1), one-on-two (1:2) or one-on-three (1:3) battle is allowed. The time can be measured by the internal clock (not shown in the figure) inside the CPU block 20, or by counting the number of the vertical interrupt processing which is called every 1/60 seconds from the TV monitor. In this case, when the player desires a one-on-one battle or one-on-two battle from the time of execution, the player can remove the checks from the allowed number of soldiers, 1:1 and 1:3, and change the 10-minute default time for the checked allowed number of soldiers, 1:2, to 0 minutes, or when the player desires to fight battles up to one-on-three from the start of execution, the player can remove the checks from the allowed number of soldiers, 1:1 and 1:2. In the next step 162, the process waits for prescribed button control, then after the prescribed button control is performed, the battle setting data are obtained and stored in RAM in step 164, the initial settings process sub-routine then ends and the process advances to step in FIG. 4.

Figure 49:
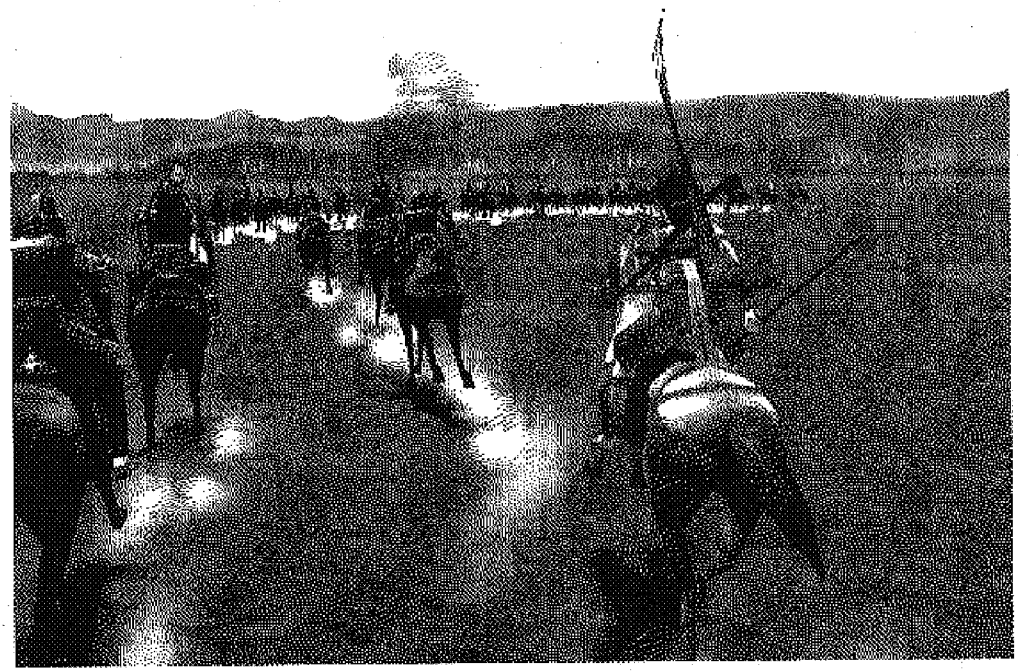
FIG. 49 is an example of the image displayed on the TV monitor when executing the charge process sub-routine.

In step 110, the army settings and battlefield settings that are stored in RAM are read and the positions, in the 3-dimensional virtual space for lining up the horse soldiers of both armies at their respective line-up points, are calculated and stored in RAM, and then in the next step 111, the data for specifying each horse soldier, the position data and the view-point position data are transferred to the image processing unit 23. The image processing unit 23 creates and outputs images on the TV monitor 4 every 1/60 seconds based on the transferred data. By doing this, the image shown in FIG. 32 is displayed on the TV monitor 4. In this embodiment of the invention, in order to obtain the 3-dimensional effect of the image shown in FIG. 32, when the image is created by the image processing unit 23, a viewpoint is placed behind and from above between the horse soldiers F4 and F5 of army F, and using perspective toward the direction of army E, and the image of each horse soldier is enlarged or compressed when creating the image. Therefore, when the player looks at the TV monitor 4, the horse soldiers of army E look smaller than the horse soldiers of army F (see FIG. 49).

Figure 33:
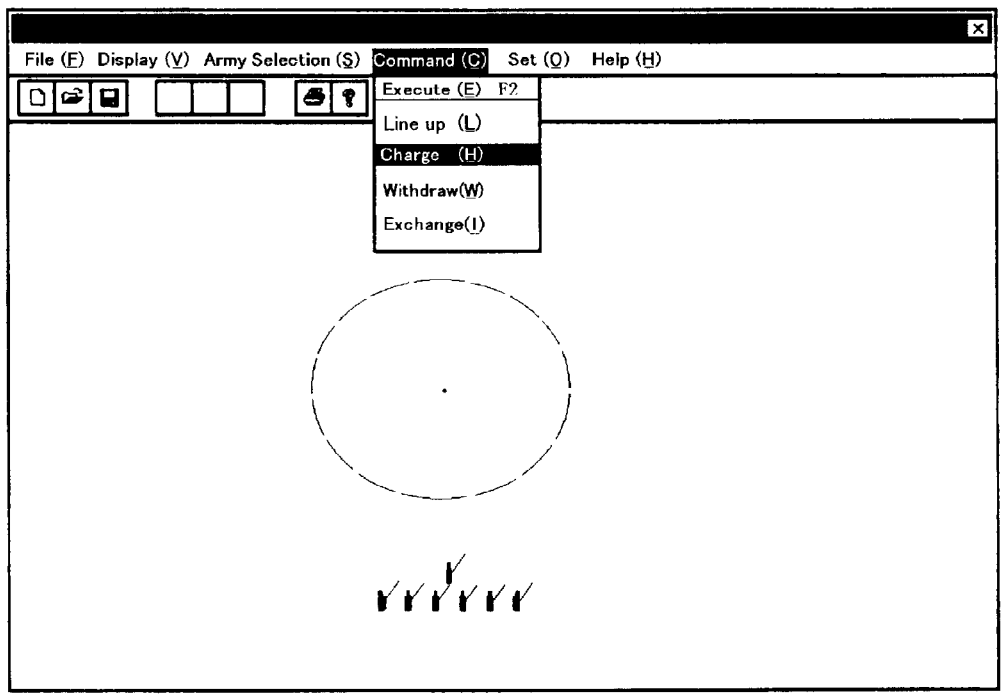
FIG. 33 is a drawing explaining the drop-down menu when the player selects 'Command' from the menu.
Figure 34:
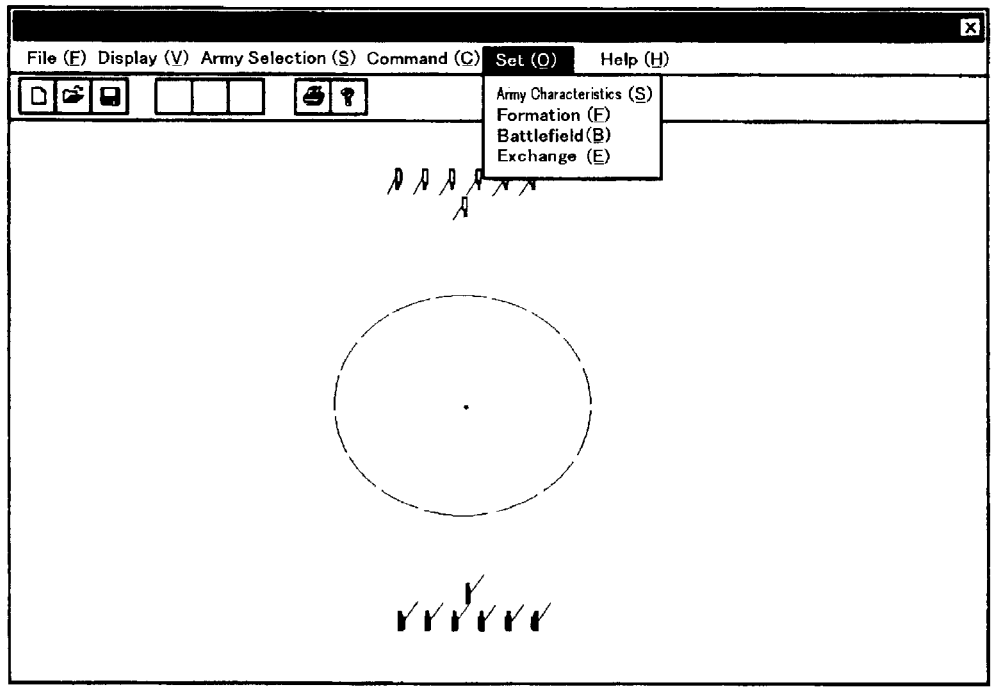
FIG. 34 is a drawing explaining the drop-down menu when the player selects 'Setting' from the menu.
Figure 35:
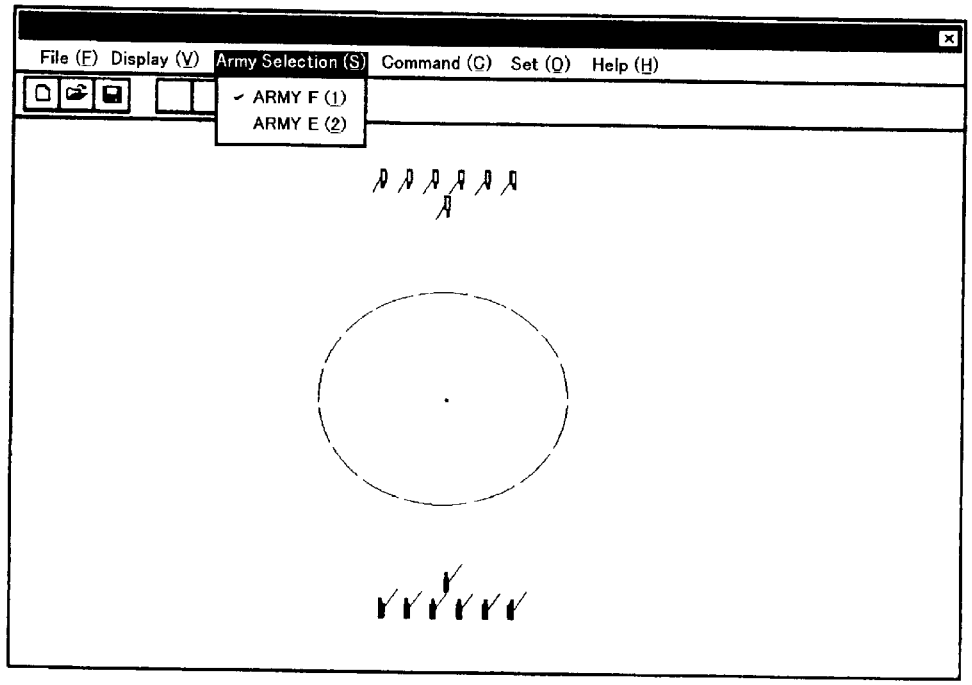
FIG. 35 is a drawing explaining the drop-down menu when the player selects 'Army Selection' from the menu.

In the next step 112, as shown in FIG. 33, 'Command' is selected from the menu with a prescribed button control by the player using the input device 3, the whether or not 'Execute (E)' is clicked on from the drop-down menu is determined. When it is determined that 'Execute (E)' has not been clicked, then in the next step 114, as shown in FIG. 34, the player selects 'Set' from the menu with a prescribed button control using the input device 3, and then selects 'Army Characteristics (S)', 'Formation (F)', 'Battlefield (B)' or 'Exchange (M)' from the drop-down menu and determines whether or not the settings have been changed, and when it is determined that the settings have not been changed, then in step 115, the corresponding dialog selected by the player, shown in FIGS. 28 to 31, is displayed and the process returns to step 110. On the other hand, when'it is determined in step 114 that the settings have been changed, then in step 116 the settings are fetched and if necessary the location of army E is recalculated and stored in RAM, then the process advances to step 115. In this way, it is possible for the player to change the settings as desired, and it is possible to visually check the formation of both armies and the battlefield on the TV monitor 4 (step 111). In this embodiment, as shown in FIG. 35, when the opponent is a second player instead of the computer, it is possible for the second player to all make settings for army E as desired.

In step 112, when it is determined that 'Execute (E)' has been clicked from the drop-down menu, then in the next step 117, first, the win flag w is taken to be 0, and the number of horse soldiers n that are added to the number of horse soldiers of both armies is calculated. (In this example: No. of horse soldiers n=(No. of horse soldiers F1 to F7; 7)+(No. of horse soldiers Ea to Eg; 7)=14.) The win flag w takes the value 0 or 1, and as described later, when the win flag is '0', then army E is considered to have won, and when the win flag w is '1', then army F is considered to have won. Next, in step 117, the damage flag dfn for each horse soldier is taken to be '0'. This flag is for determining whether or not a horse soldier has received damage, and as described later, when damage has been received, the damage flag dfn is '1'. Moreover, in this step 117, a wandering reference point is set for each horse soldier of both armies. Explaining the wandering reference point in reference to FIG. 32, this point (coordinates) is an arbitrary point within the battlefield circle Bc, and it is selected at random for each horse soldier such that it does not overlap the wandering reference point of another horse soldier. In the next step 118, the status flags FL for all of the horse soldiers F1 to F7 and Ea to Eg for both armies is taken to be 'Charge'. Each horse soldier takes one of the states from among the eighteen states shown in Table 1, and that current state is taken to be the status for the status flag FL. Each of the states are summarized in Table 1, and will be explained in detail later. Wandering and circling enemy search are called enemy search, and approach, confrontation, turn, weapon hand change, attack, damage, repulsion and defense are called battle, and states other than these are called other states, hereinafter.

TABLE 1

| | Status | Description of Status |
|---|---|---|
| Enemy-Search | Wandering Enemy Search | Search for the enemy while wandering. |
| | Circling Enemy Search | Search for the enemy while circling. |
| Battle | Approach | Move the distance with the enemy to within the battlefield radius. |
| | Confrontation | Stop and store up attack strength. |
| | Turn | Turn and change position in order to attack. |
| | Weapon hand change | Change the weapon to the other hand before attacking. |
| | Attack | Attempt to afflict damage on the enemy with the weapon. |
| | Damage | The enemy's attack was effective and life points are decreased. |
| | Reaction | Impact is received after and attack was defended. |
| | Defense | Defend self from enemy attack after own attack failed. |
| Other | Withdraw | Withdraw the entire army from the battlefield. |
| | Fall | Horse soldier fall from his horse before dying. |
| | Dead | Horse soldier is dead. |
| | Enemy-search transition | Change weapon to the right hand before wandering enemy search. |

TABLE 1-continued

| Status | Description of Status |
|---|---|
| Threat | Make a show as if to attack the enemy. |
| Recoil | Momentarily frightened after being threatened by the enemy. |
| Escape | Escape in the opposite direction of the enemy. |
| Charge | Move inside the battlefield circle. |

Next, in step 120, whether an interrupt has occurred is determined by determining whether or not vertical blanking interrupt processing has been executed by the vertical blanking period that is called at a period of once every $1/60$ seconds (approx. 16.6 ms). In step 120, when it is determined that no interrupt has occurred, then in the next step 122, processing for the input data transferred from the input receiving unit 21, such as a change in view point, or main process such as audio processing for making the audio processing unit 24 synthesize game sound-effects is executed, and then the process advances to the next step 124. In step 124, while the player continues the game, the player selects 'Command' from the menu shown in FIG. 33 by using the prescribe button control on the input device 3, and selects 'Withdraw (W)' from the drop-down menu. It is then determined whether or not 'Execute (E)' has been clicked. When it is determined that 'Execute (E)' has not been clicked, then the process advances to step 132, and when it is determined that 'Execute (E)' has been clicked, then in step 126, the status flags of all of the horse soldiers, except horse soldiers whose status flags FL are 'Dead', become 'Withdraw'. Next, in step 128, the line-up point for the surviving horse soldiers is calculated, and the process advances to step 132. When calculating the line-up point, first, the directions for army F and army E are determined by determining whether or not the Win flag w is '0', then the line-up point is read from the army settings that were stored in RAM in step 146 and step 116, and the line up is calculated based on the current number of surviving horse soldiers. In other words, as shown in FIG. 39, when the Win flag w=0 and the player issues the 'Withdraw' command, the position of the leader is calculated with the direction of army F in the opposite direction (180-degree turn) of the line-up direction before starting the charge, as shown in FIG. 32, then the positions of the surviving horse soldiers are calculated based on the position of the leader.

Figure 6:
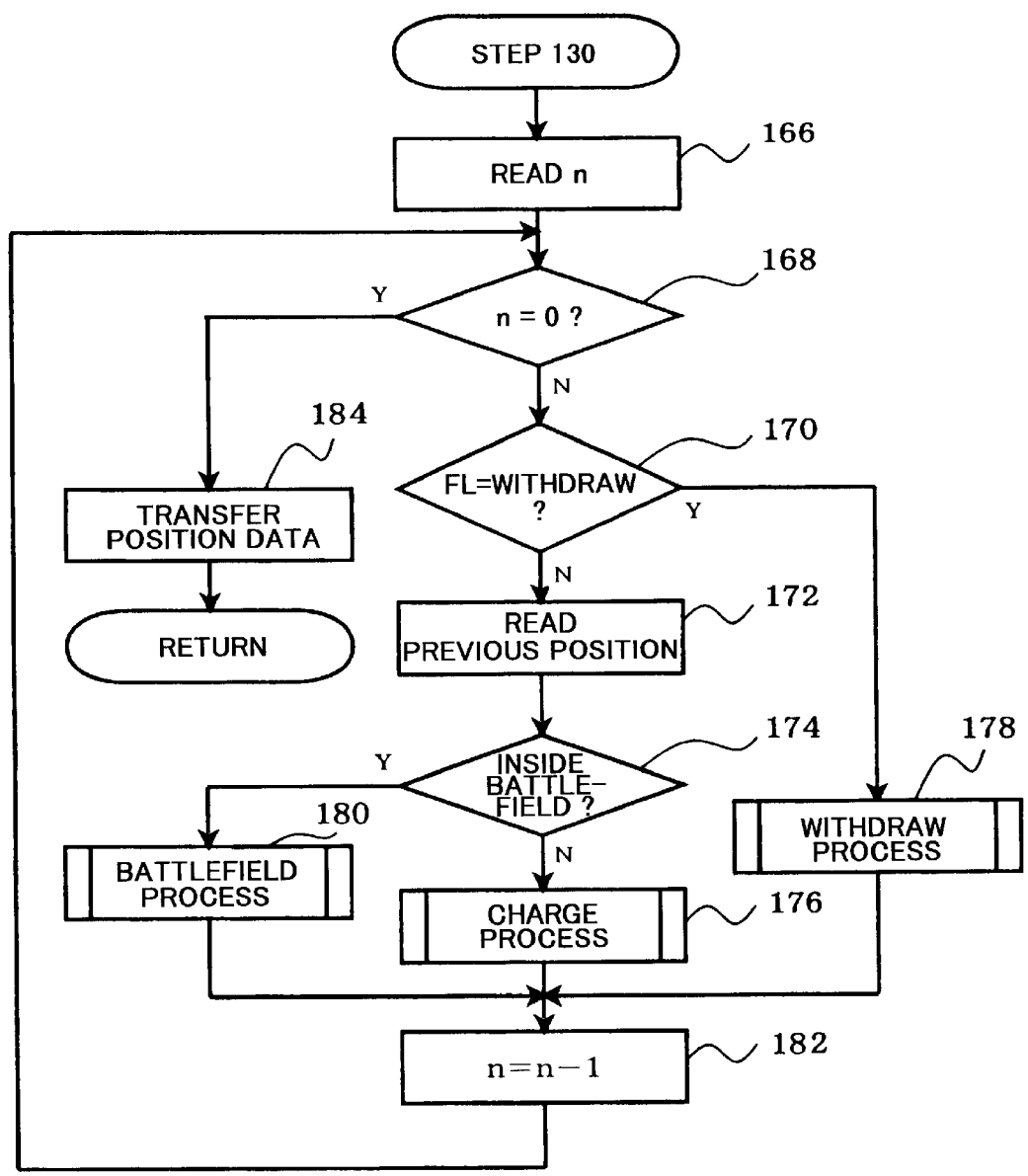
FIG. 6 is a flowchart showing the details of the enemy-search and battle process sub-routine of step 130 of the enemy-search and battle routine.

On the other hand, when it is determined in step 120 that an interrupt has occurred, then in step 130, the enemy-search and battle process sub-routine for making the horse soldiers of both armies charge and perform enemy search and battle is executed within the interrupt processing time of $1/60$ seconds. As shown in FIG. 6, in this enemy-search and battle process sub-routine, charging continues when the horse soldiers have not yet reached the battlefield, then battlefield processing is executed when the horse soldiers reach the battlefield, and when a 'Withdraw' command is issued, the withdraw process is performed for each of the horse soldiers.

First, in step 166, the number of horse soldiers n is read, then in the next step 168, the number of horse soldiers is determined whether or not it is '0'. When it is determined that the number is '0', it means that processing for all of the horse soldiers is complete and in step 184, position data for all of the horse soldiers are transferred to the image processing unit 23 and an image is created as was done in step 111. The image processing unit 23 displays the enemy-search and battle status on the TV monitor. 4 by outputting images to the TV monitor 4 that are created every $1/60$ seconds. On the other hand, when it is determined that the number is not '0', then in the next step the status flag FL is determined whether or not it is Withdraw in order to determine whether or not the player has issued a Withdraw command, and when it is determined that it is not Withdraw, then in step 172 the previous position (position stored in RAM ⅟60 seconds before) of the horse soldier to be processed (called object horse soldier below) is read (in the case of the first position, this is the line-up position of the object horse soldier that is stored in RAM in step 146 or 116), and in the next step 174, it is determined whether or not the object horse soldier is within the battlefield circle Bc. In step 174, when it is determined that the object horse soldier is not in the battlefield circle Bc, then in step 176 the charge process sub-routine, for moving the object horse soldier into the battlefield circle Bc, is executed.

Figure 7:
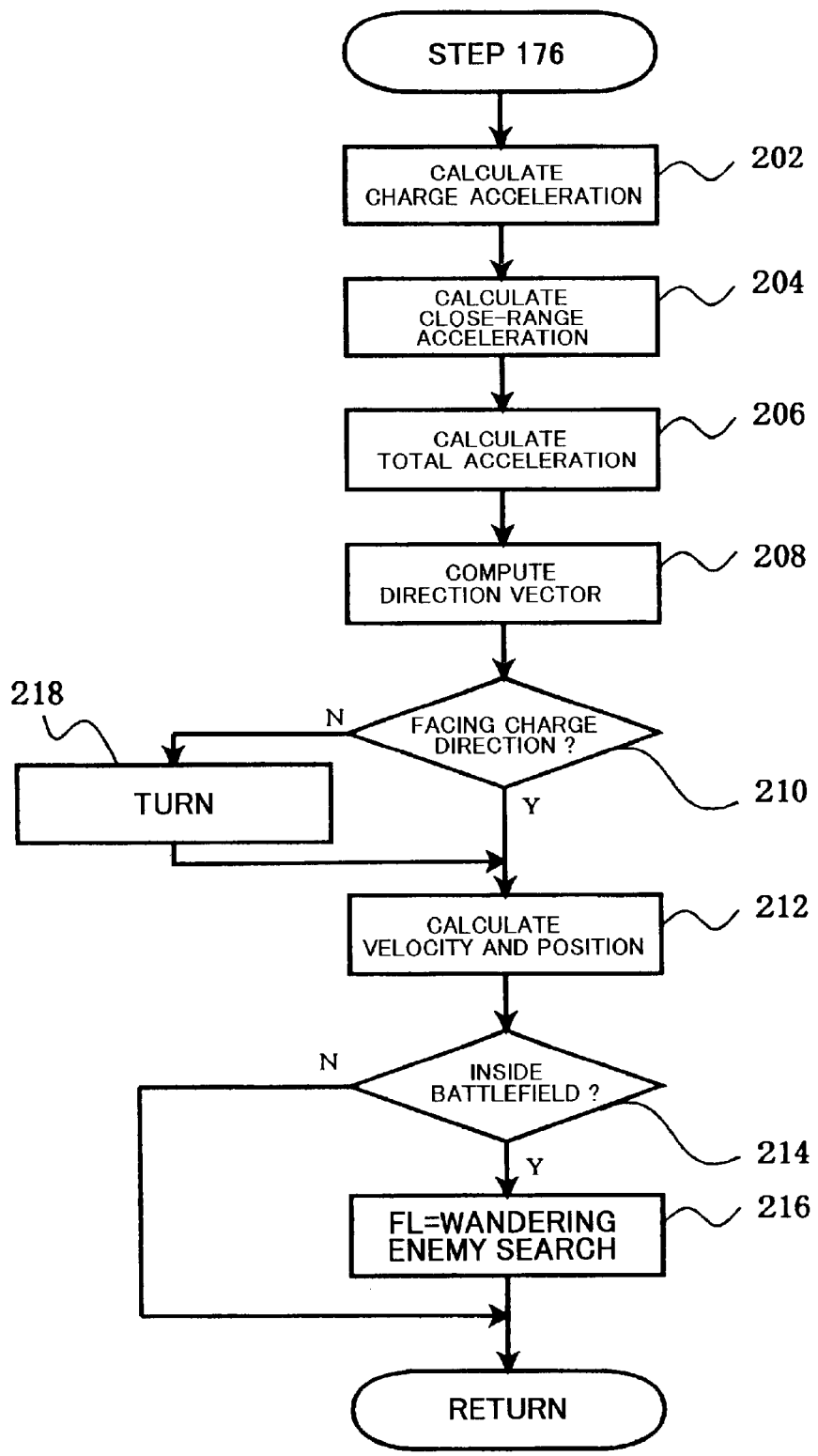
FIG. 7 is a flowchart showing the details of the charge process sub-routine of step 176 of the enemy-search and battle process sub-routine.

As shown in FIG. 7, in the charge process sub-routine, first, in step 202, the charge acceleration (ax, ay, az) for matching the charge speed (see FIG. 29) of the object horse soldier is calculated and stored in RAM. Here, ax, ay and az are the acceleration components in the x, y and z directions, respectively. For example, in this example, the first charge acceleration at the line-up point for a velocity (vx, vy, vz)=(0, 0, 0) and charge direction of 90 degrees (see FIG. 29), can be calculated as: ax=0, az=0 and az=(charge velocity: 14 m/s)×60 (1/s)=840 m/s². As shown in FIG. 30, the maximum acceleration that a horse soldier can have is 35 m/s², so the charge acceleration of the object horse soldier is (ax, ay, az)=(0, 35, 0). The velocities, vx, vy and vz are the velocity components in the x, y and z directions, respectively.

In the next step 204, the close-range acceleration is calculated for finding the acceleration the occurs when trying to move more then a set distance to avoid making contact with or hitting another horse soldier (in this case a friendly soldier). In this calculation of the close-range acceleration, first, the short-range perception angle and close-range perception radius that were fetched in step 158 shown in FIG. 5, are read. Here, the close-range perception angle is the angle of the proximate field of view in the current direction that the horse soldier is facing his head, and as shown in FIG. 30, in this embodiment the default value for this angle is 190 degrees. Moreover, the close-range perception radius is the proximate distance that the horse solder can see inside the close-range perception angle, and as shown in FIG. 30, in this embodiment the default value is 3 m.

Figure 37:
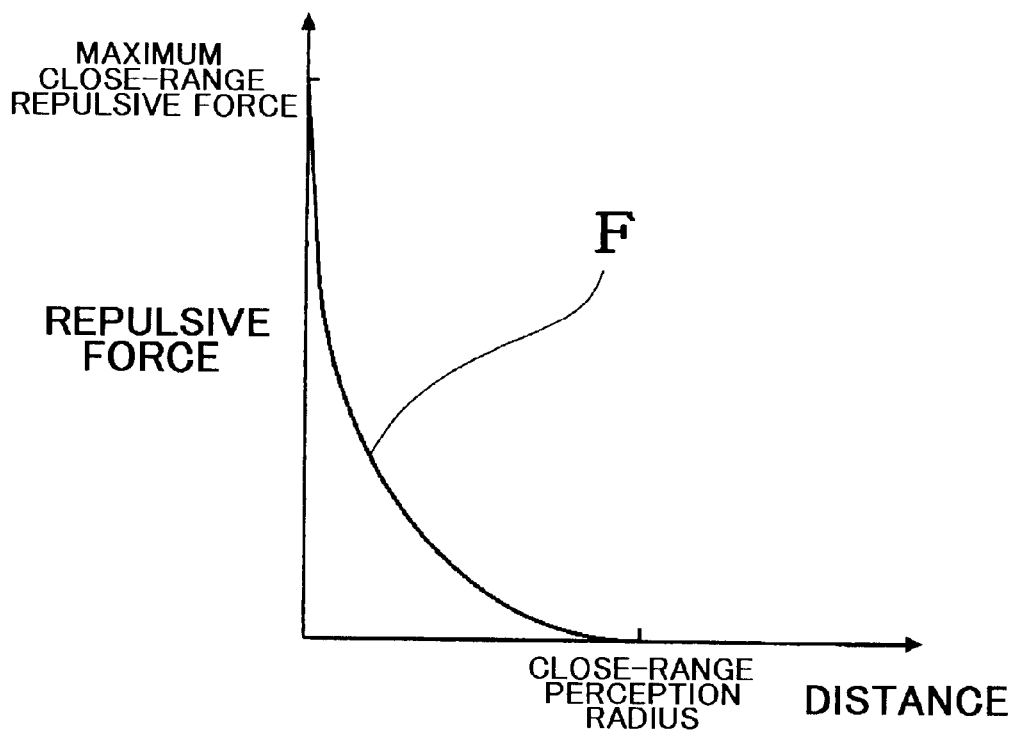
FIG. 37 is a drawing explaining the relationship between distance and repulsive force with the repulsive force on the vertical axis and the distance on the horizontal axis.

Next, the position of another horse soldier that was stored in RAM during the previous vertical blanking interrupt processing (⅟60 seconds before) is read, and it is determined whether or not the other horse soldier is inside the close-range area drawn by the close-range perception angle and close-range perception radius. When another horse soldier is in the area, then the distance from that horse soldier is found, and the repulsive force for that distance is found. As described above, the objective is to avoid making contact with or hitting another horse soldier at close range, so when another horse soldier comes near, it is desired to quickly move away from that horse soldier, so, as shown in FIG. 37, the repulsive force is taken to be along the vertical axis and the distance is taken along the; horizontal axis, the relationship between the repulsive force and the distance, as in the case of a quadratic function, is calculated such that the repulsive force rapidly increases as the distance from the other horse soldier becomes small. Therefore, the repulsive force when the distance is 0 is the maximum close-range repulsive force shown in FIG. 30, and when the distance is equal to the close-range perception radius, the repulsive force becomes 0. The product of the acceleration obtained by dividing this found repulsive force by the mass (refer to the units of the maximum close-range repulsive force in FIG. 30) and the vector in the direction from the other horse soldier toward-the object horse soldier is found for each component ax, ay and az, and the result is the close-range acceleration. Moreover, it is determined whether yet another horse soldier is in the close-range area, and when it is determined that there is a horse soldier in the area, the repulsive force is found in the same way, and the acceleration is found from the repulsive force and the x, y and z components are added to the close-range acceleration found before and the result is stored in RAM as the close-range acceleration (ax, ay, az). The process then advances to step 206. On the other hand, when there is no other horse soldier in the close-range area, then the repulsive force is '0', similar to the case when the distance is equal to the close-range perception radius, and the close-range acceleration (ax, ay, az)=(0, 0, 0) is stored in RAM, and the process advances to step 206.

In step 206, the charge acceleration and close-range acceleration, that are stored in RAM, are read, the x, y, z components are added, the total acceleration is stored in RAM, and in the next step 208, the direction vector is computed. Here, the direction vector is a unit vector whose magnitude (length) has no meaning, but is a vector (x, y, z) whose direction only has meaning. The direction vector can be obtained by changing the total acceleration to a unit vector.

Figure 38:
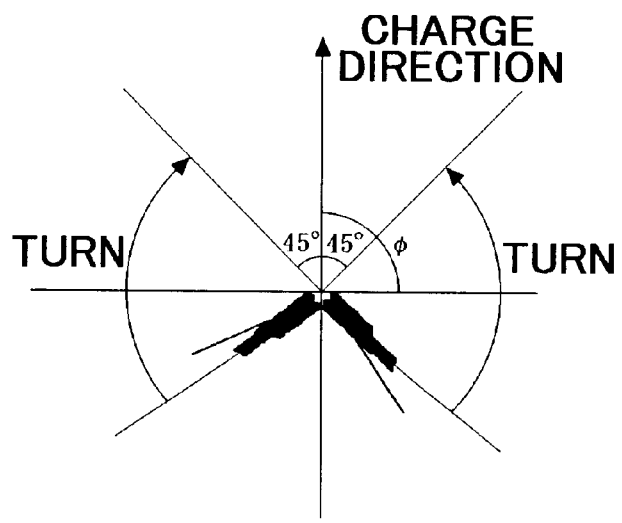
FIG. 38 is a drawing explaining the direction when the horse soldier turns during an attack.

In the next step 210, since the close-range acceleration is generated according to the charge direction or army formation (particularly, the line and row spacing), it is determined from the direction vector found in step 208 whether or not the object horse soldier is facing in a direction within +−45 degrees of the charge direction. When it is determined that the object horse soldier is not facing in that direction, then in step 218, the acceleration for turning 1.5 deg (90 deg/sec, refer to the maximum angular velocity in FIG. 30) is found and added to the total acceleration, then the process advances to step 212. As shown in FIG. 38, the direction of circling is in a direction such that the horse soldier faces forward with the smallest circling angle. By doing this, the object horse soldier can charge while gradually turning.

In the next step 212, the most recent velocity and most recent position are computed and stored in RAM, then the process advances to the next step 214. Here, where the current time is t, the elapsed time is dt, velocity is V (Vt+dt: velocity at time t+dt, Vt: velocity at time t), acceleration is a (at: acceleration at time t), and position is P (Pt+dt: position at time t+dt, Pt: position at time t), it is possible to obtain the most recent velocity and most recent position from the equations of motion using Euler's method shown in Equations (1).

$$\left. \begin{array}{l} V_{t+\delta t} = V_t + a_t \delta_t \\ P_{t+\delta t} = P_t + V_t \delta_t + 0 \cdot 5 a_t \delta_t^2 \end{array} \right\} \quad (1)$$

Moreover, from the equations (1), the most recent velocity and most recent position can be found as: Most recent velocity=Previous velocity+Elapsed time×Acceleration; Most recent position=Previous position+Elapsed time×(Velocity +0.5×Elapsed time×Acceleration). For the 3-dimensional coordinate system of this embodiment, as shown in the equations (2), every time there is interrupt processing, the x, y and z components for the 3-dimensional coordinate system are found to obtain the most recent acceleration, and then the most recent velocity and most recent position are calculated and the values for the most recent velocity and most recent position are stored in RAM (an explanation of storing the most recent velocity and most recent position in RAM will be omitted below).

$$\left.\begin{aligned} V_{t+\delta tx} &= V_{tx} + \alpha_{tx}\delta_t \\ P_{t+\delta tx} &= P_{tx} + V_{tx}\delta_t + 0\cdot 5\alpha_{tx}\delta_t^2 \\ V_{t+\delta ty} &= V_{ty} + \alpha_{ty}\delta_t \\ P_{t+\delta ty} &= P_{ty} + V_{ty}\delta_t + 0\cdot 5\alpha_{ty}\delta_t^2 \\ V_{t+\delta tz} &= V_{tz} + \alpha_{tz}\delta_t \\ P_{t+\delta tz} &= P_{tz} + V_{tz}\delta_t + 0\cdot 5\alpha_{tz}\delta_t^2 \end{aligned}\right\} \quad (2)$$

In step 214, it is determined from the most recent position found in step 212 whether or not the object horse soldier is inside the battlefield circle Bc, and when it is determined that the object horse soldier is not inside the battlefield circle Bc, the charge process ends and the process advances to step 182 in FIG. 6, and when it is determined that the object horse soldier is inside the battlefield circle Bc, the status flag FL of the object horse soldier is set to wandering enemy search, and then the charge process ends and the process advances to step 182.

Figure 4:
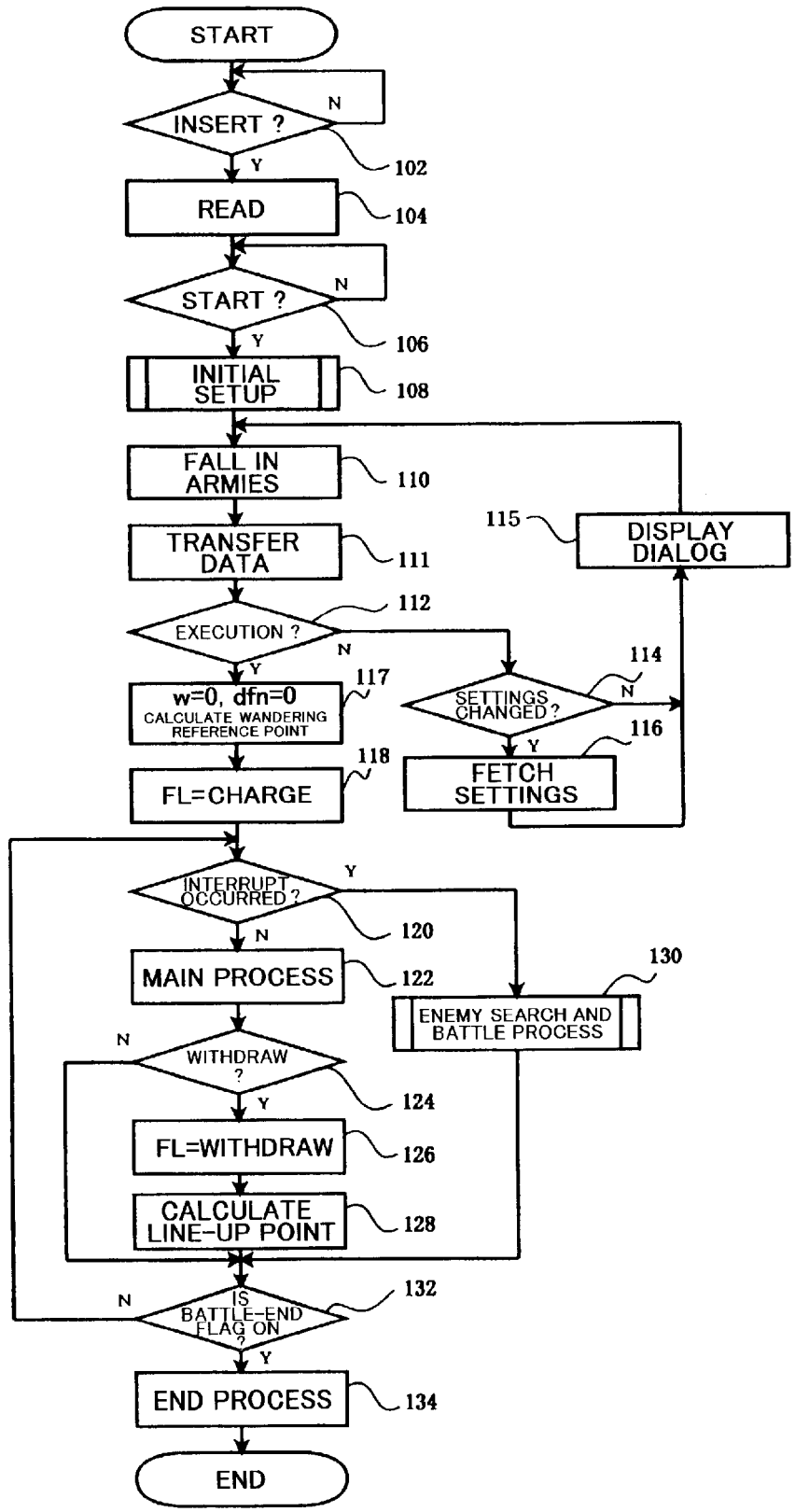
FIG. 4 is a flowchart showing the enemy-search and battle routine of an embodiment of the invention.
Figure 8:
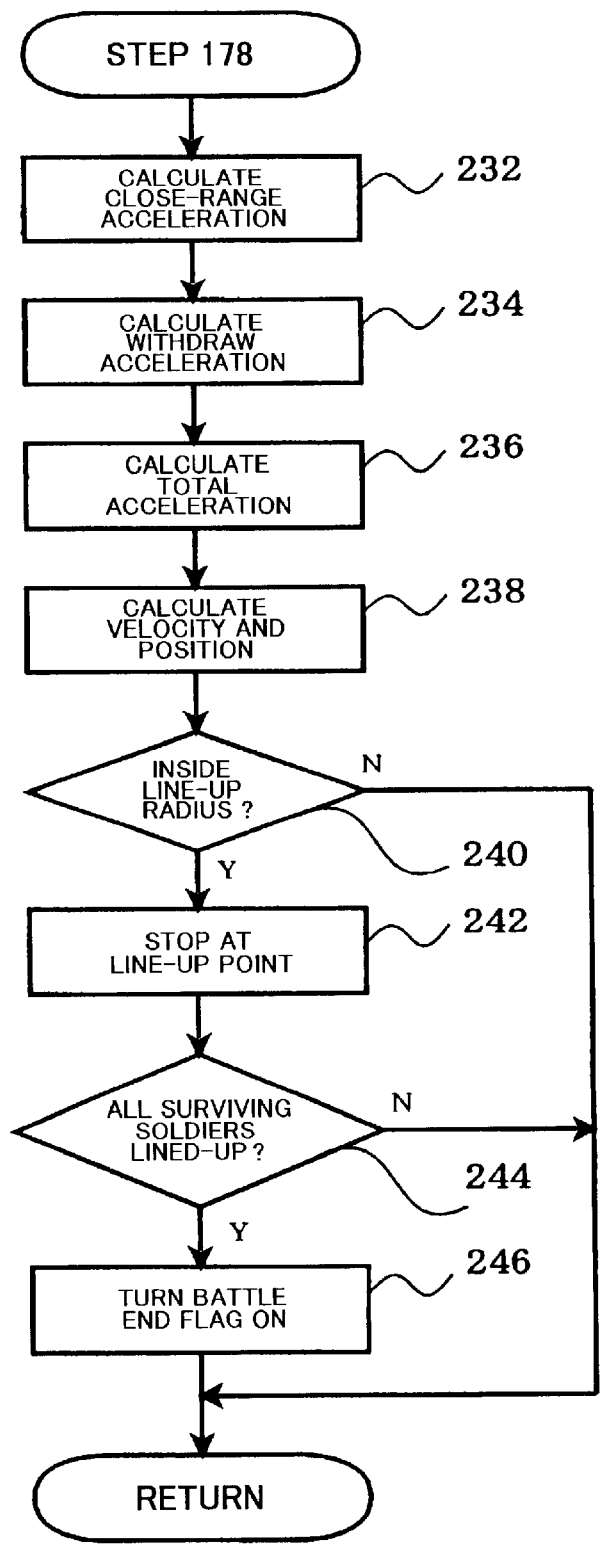
FIG. 8 is a flowchart showing the details of the withdraw process sub-routine of step 178 of the enemy-search and battle process sub-routine.

On the other hand, in step 170 in FIG. 6, when it is determined that the status flag FL is Withdraw, then the withdraw process sub-routine is executed in step 178 in order to line up the surviving horse soldiers at the line-up point calculated in step 128 in FIG. 4. As shown in FIG. 8, in this withdraw process sub-routine, first, in step 232, the close-range acceleration described above is calculated, then in the next step 234, the withdraw acceleration is calculated. In this calculation for the withdraw acceleration, the line-up point for the object horse soldier, that was stored in RAM in step 128, is read, the direction vector (x, y, z) from the position of the object horse soldier to the line-up point is found, and the withdraw acceleration is calculated using Equation (3). Incidentally, in Equation (3), the velocity-equalizing time parameter is a time parameter used for obtaining acceleration from the movement velocity, and as shown in FIG. 30, in this embodiment, the default value for this time is approximately 0.3 second.

Acceleration (x,y,z)={(Current soldier direction vector (x,y,z)× Battle velocity)−Current velocity (x,y,z)}/Velocity-equalizing time parameter (3)

In the next step 236, each of the x, y and z components of the close-range acceleration and withdraw acceleration, that were found in step 232 and step 234, are added to calculate the total acceleration, then in step 238, the most recent velocity and position of the object horse soldier are computed with the Euler method described above. Next, in step 240, it is determined whether or not the object horse soldier is inside a 5-meter line-up radius with the center being the line-up point of the object horse soldier, and when it is determined that the object horse soldier is not within that radius, the withdraw process sub-routine ends and the process advances to step 182 in FIG. 6, and when it is determined that the object horse soldier is inside the radius, then instep 242, it is regarded that the object horse soldier has reached the line-up point and the object horse soldier stops at the line-up point (see FIG. 39).

Next, in step 244, it is determined whether or not the surviving horse soldiers have all lined up at their respective line-up points, and when it is determined that they haven't, then the withdraw process sub-routine ends and the process advances to step 182. However, when it is determined that the horse soldiers have lined up, then in the next step 246, the battle end flag is turned ON, the withdraw process sub-routine ends and the process advances to step 182.

Figure 9:
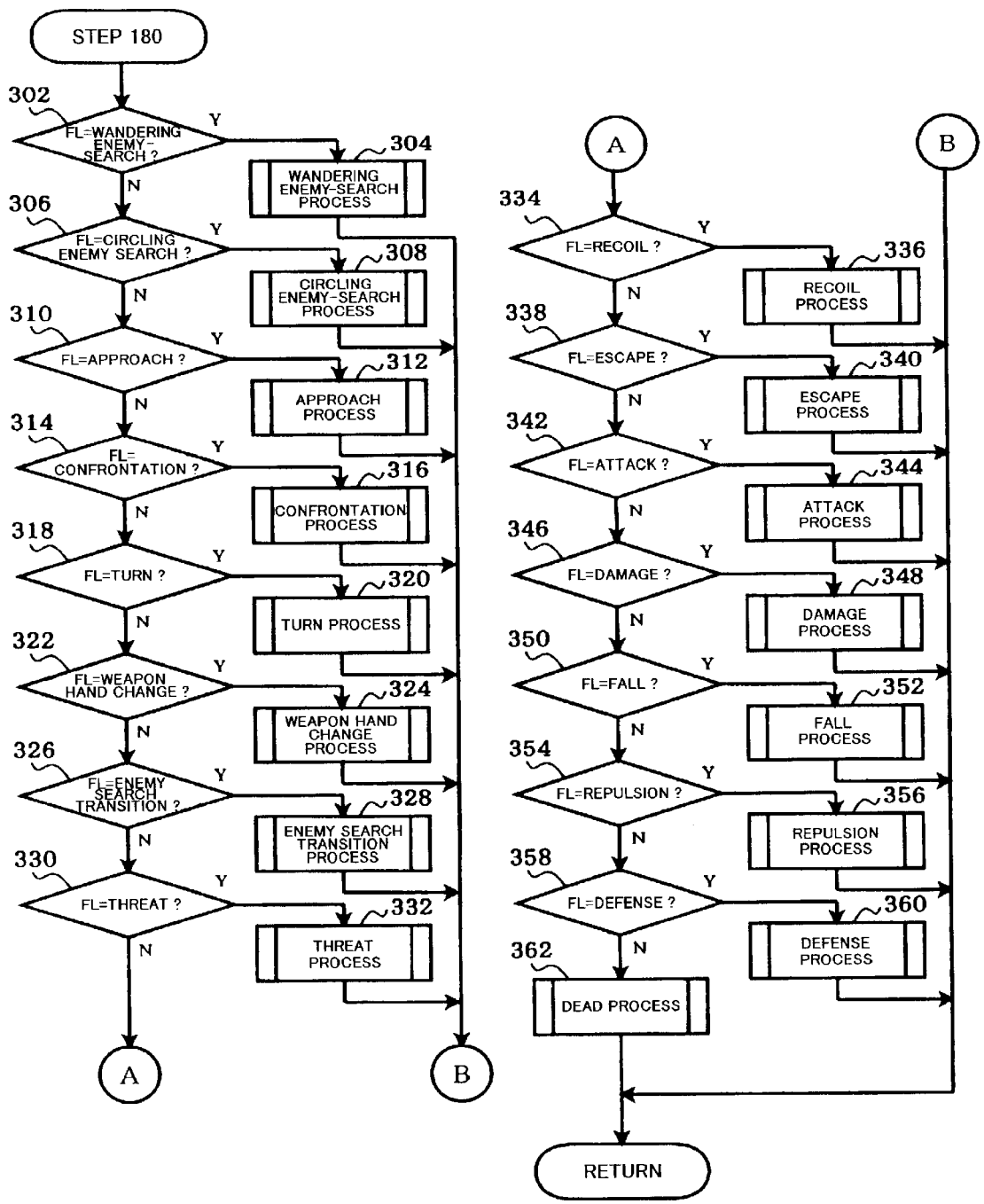
FIG. 9 is a flowchart showing the details of the battlefield process sub-routine of step 180 of the enemy-search and battle process sub-routine.

When it is determined in step 174 in FIG. 6 that the object horse soldier is within the battlefield circle Bc, then in step 180, the battlefield process sub-routine for the horse soldiers of both armies perform enemy search and battle within the battlefield and wandering area, to be described later, is executed. As shown in FIG. 9, this battlefield process sub-routine determines in step 302 whether or not the status flag FL of the object horse soldier is wandering enemy search, and when it is determined that the status flag FL is wandering enemy search, then in step 304 the wandering enemy-search process sub-routine, described later, is executed, and when in step 302 it is determined that the status flag FL is not wandering enemy search, then in the next step 306, it is determined whether or not the status flag FL of the object horse soldier is circling enemy search, and when the status flag is circling enemy search, then in step 308, the circling enemy-search process sub-routine, described later, is executed.

When it is determined in step 306 that the status flag FL is not circling enemy search, then in the next step 310, it is determined whether or not the status flag of the object horse soldier is approach, and when it is determined that the status flag FL is approach, then in step 312, the approach process sub-routine, described later, is executed. However, when it is determined in step 310 that the status flag FL is not approach, then in the next step 314, it is determined whether or not the status flag FL of the object horse soldier is confrontation, and when it is determined that the status flag FL is confrontation, then in step 316, the confrontation process sub-routine, described later, is executed. However, when it is determined in step 314 that the status flag is not confrontation, then in the next step 318, it is determined whether or not the status flag FL of the object horse soldier is turn, and when it is determined that the status flag is turn, then instep 320, the turn process sub-routine, described later, is executed.

When it is determined in step 318 that the status flag FL is not turn, then in the next step 322, it is determined whether or not the status flag FL of the object horse soldier is weapon hand change. When it is determined that the status flag FL is weapon hand change, then in step 324, the weapon hand change process sub-routine, described later, is executed. However, when it is determined in step 322 that the status flag FL is not weapon hand change, then in the next step 326, it is determined whether or not the status flag FL of the object horse soldier is enemy-search change. When it is determined that the status flag FL is enemy-search transition, then in step 328, the enemy search transition process sub-routine, described later, is executed. However, when it is determined in step 326 that the status flag is not enemy-search transition, then in the next step 330, it is determined whether or not the status flag FL of the object horse soldier is threat. When it is determined that the status flag is threat, then in step 322 the threat process sub-routine, described later, is executed.

When it is determined in step 330 that the status flag FL is not threat, then in the next step 334, it is determined whether or not the status flag FL of the object horse soldier is recoil. When it is determined that the status flag FL is recoil, then in step 336, the recoil process sub-routine, described later, is executed. However, when it is determined in step 334 that the status flag FL is not recoil, then in the next step 338, it is determined whether or not the status flag FL of the object horse soldier is escape. When it is determined that the status flag FL is escape, then in step 340, the escape process sub-routine, described later, is executed. However, when it is determined in step 338 that the status flag is not escape, then in the next step 342, it is determined whether or not the status flag FL of the object horse soldier is attack. When it is determined that the status flag FL is attack, then in step 344, the attack process sub-routine, described later, is executed.

When it is determined in step 342 that the status flag FL is not attack, then in the next step 346, it is determined whether or not the status flag FL of the object horse soldier is damage. When it is determined that the status flag FL is damage, then in step 348, the damage process sub-routine, described later, is executed. However, when it is determined in step 346 that the status flag FL is not damage, then in the next step 350, it is determined whether or not the status flag FL of the object horse soldier is fall. When it is determined that the status flag FL is fall, then in step 352, the fall process sub-routine, described later, is executed. However, when it is determined in step 350 that the status flag FL is not fall, then in the next step 354, it is determined whether or not the status flag of the object horse soldier is repulsion. When it is determined that the status flag FL is repulsion, then in step 356, the repulsion process sub-routine, described later, is executed.

When it is determined in step 354 that the status flag FL is not repulsion, then in the next step 358, it is determined whether or not the status flag FL of the object horse soldier is defense. When it is determined that the status flag FL is defense, then in step 360, the defense process sub-routine, described later, is executed. When it is determined in step 358, that the status flag FL is not defense, then in the next step, the dead process sub-routine, described later, is executed, then the battlefield process sub-routine ends and the process advances to step 182 in FIG. 6.

<Wandering Enemy-Search Process Sub-routine>

Figure 10:
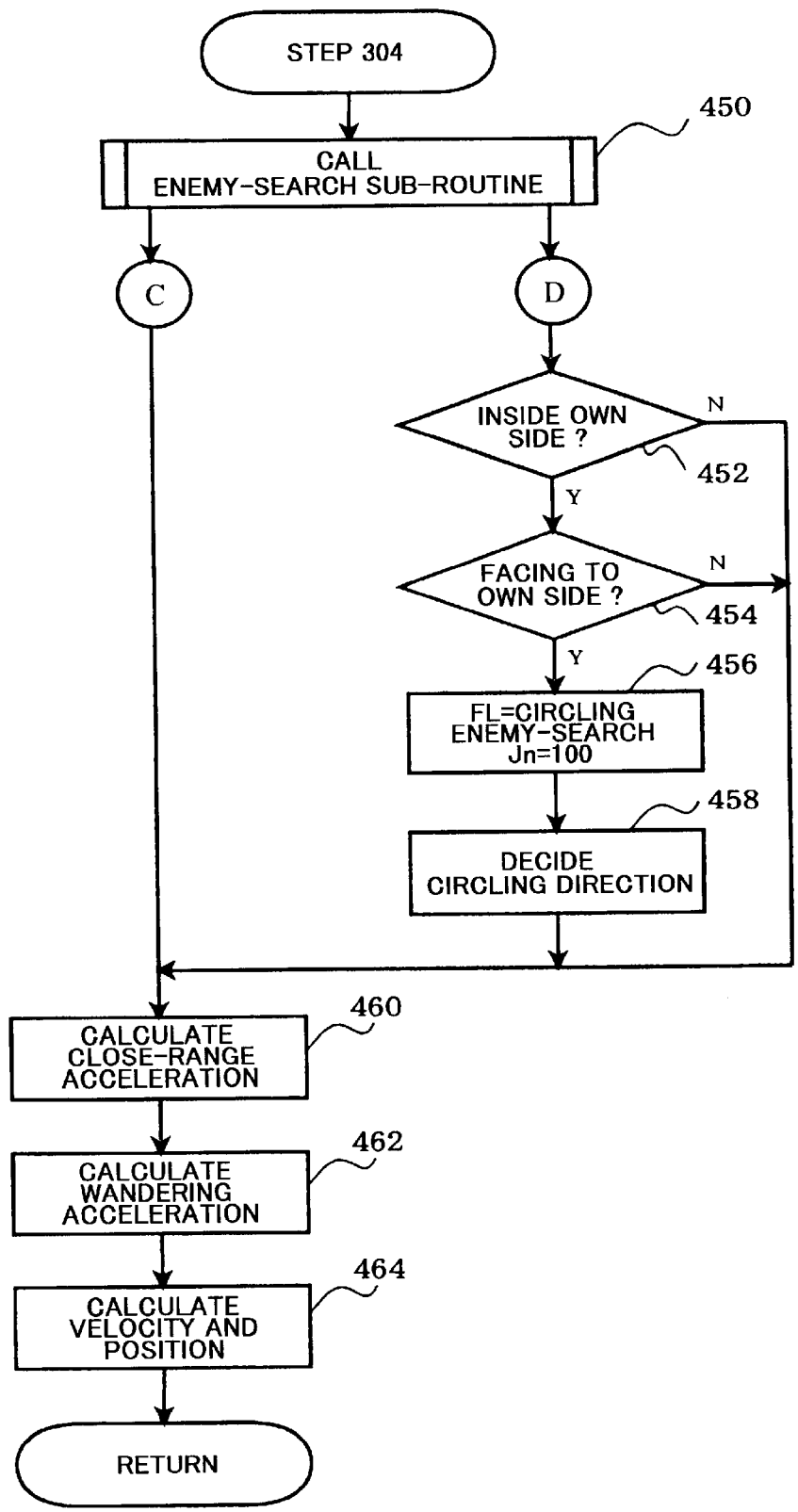
FIG. 10 is a flowchart showing the details of the wandering enemy-search process sub-routine of step 304 of the battlefield process sub-routine.
Figure 11:
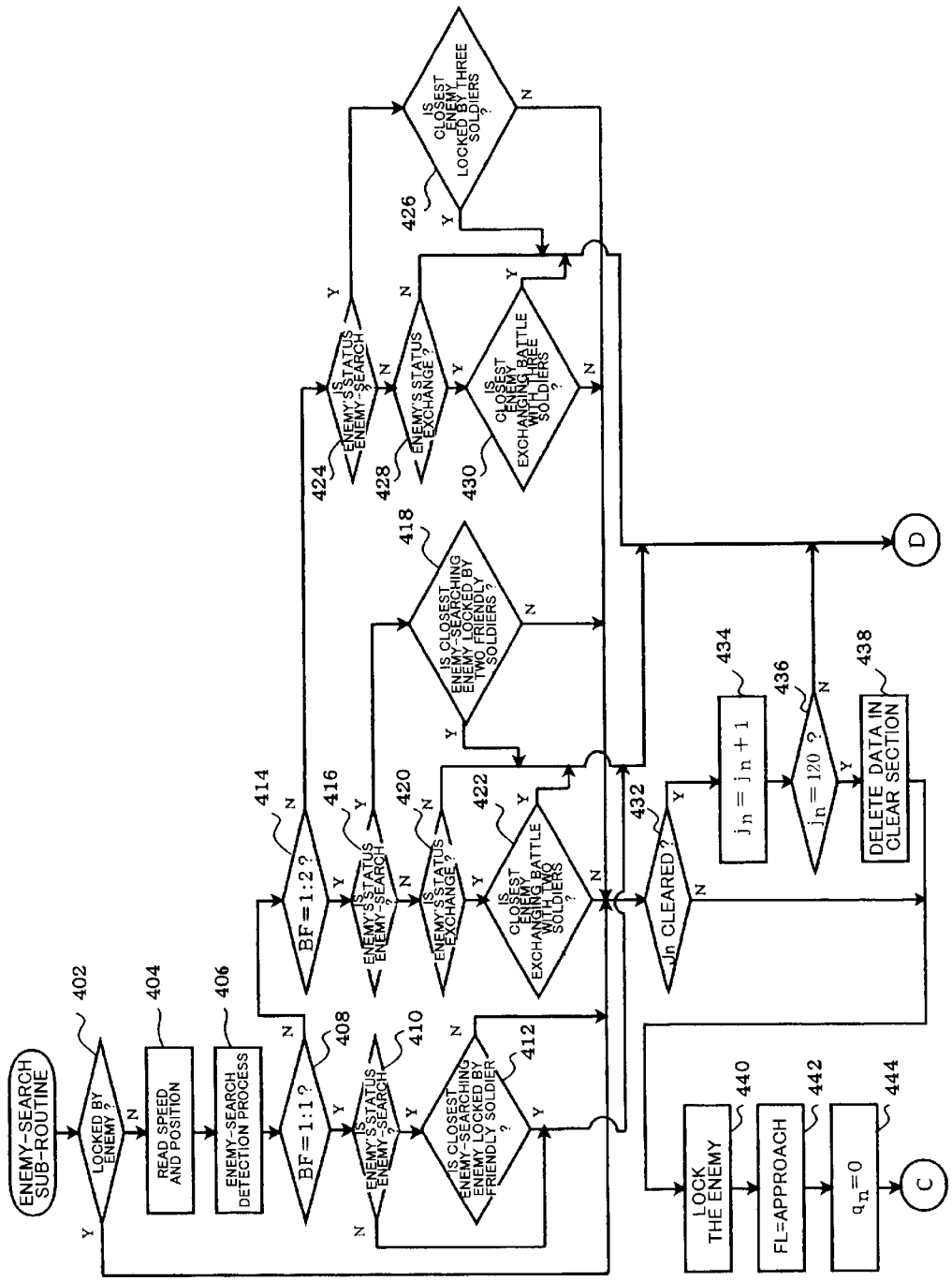
FIG. 11 is a flowchart of the enemy-search sub-routine that is called up by the wandering enemy-search sub-routine and the circling enemy-search sub-routine.

As shown in FIG. 10, in the wandering enemy-search process sub-routine of step 304, in step 450, the enemy-search sub-routine that is shown in FIG. 11 is called up. The flowchart is made such that the connection points C and D in FIG. 10 are connected to the respective connection points C and D in FIG. 11.

As shown in FIG. 11, in the enemy-search sub-routine that is called up in step 450, first, in step 402, it is determined whether or not the object horse soldier has been locked by the enemy, by determining whether or not the data for identifying the enemy horse soldier that object horse soldier has locked on have been entered into the lock data. The lock data comprises an locked section and locking section, and as shown in FIG. 40A, when the object horse soldier F2 has been locked on by the enemy soldier Eb, for example, then the data Eb for identifying the enemy horse soldier Eb that locked on is entered in the locked section of the lock data for the object horse soldier F2. The number of enemy horse soldiers that can be entered in the locked section is one. When it is determined in step 402 that the enemy has locked on, then the process advances to step 432, however when it is determined in step 402 that the enemy has not locked on, or in other words, as shown in FIG. 40C, when the locked section of the lock data is 0 (null), then in the next step 404, the previous speed, position and direction vector of the object horse soldier, that were stored in RAM, are read, and in step 406 the enemy-search detection process is executed.

Figure 36:
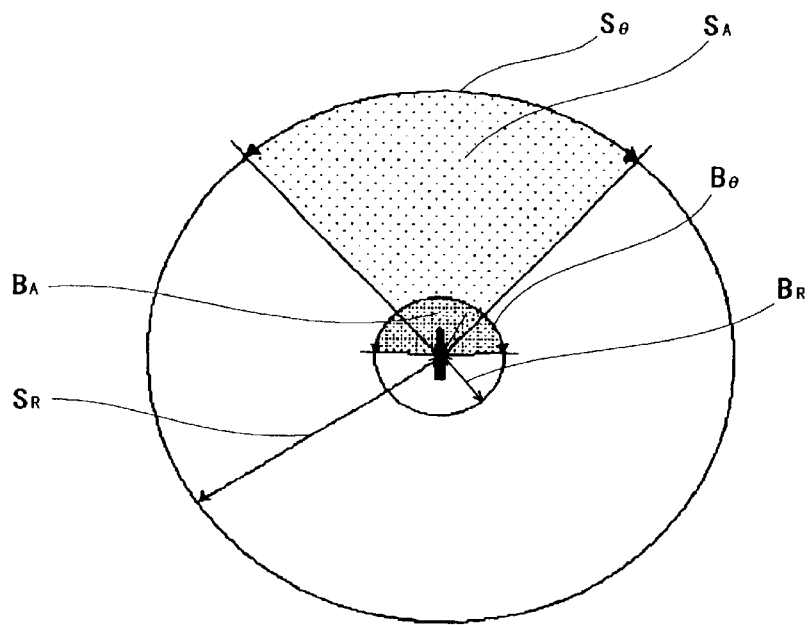
FIG. 36 is a drawing explaining the enemy-search area and battle area of horse soldiers.

As shown in FIG. 36, the direction vector and position of the object horse soldier are already known, then the enemy-search area SA is defined as the first area, and the battle area BA is defined as the second area as follows. The enemy-search area SA, is the range that the object horse soldier can see when searching for an enemy horse soldier, and it is an area specified by the enemy-search angle $S_\theta$ and the enemy-search radius SR. In this example, as shown in FIG. 30, the default value for the enemy-search angle is $S_{\theta=}$90 degrees, and the default value for the enemy-search radius is SR=14 m. Moreover, the battle area BA is the area where the object horse soldier can battle, and it is an area specified by the battle angle BA, and the battle radius BR. In this example, as shown in FIG. 30, the default value for the battle angle is BA=170 degrees, and the default value for the battle radius is BR=3 m.

In the enemy-search detection process of this step 406, the position and status of enemy horse soldiers inside the enemy-search area SA of the object horse soldier are detected. For example, when the object horse soldier is taken to be F2, the positions of the enemy horse soldiers Ea to Eg are checked in order, and as shown in FIG. 41A, the positions for the enemy horse soldiers Ea, Ec, Ef, and Eg that are inside the enemy-search area SA are obtained. Next, as shown in FIG. 41B, the enemy horse soldiers Ea, Ec, Ef and Eg are rearranged in order starting from closes to the object horse soldier F2, and as shown in FIG. 41C, by checking the status flags of the enemy horse soldiers Ea, Eg, Ef and Ec, it is possible to know the position and status of the enemy horse soldiers. (For convenience, the data shown in FIG. 41C is called detection data.)

Figure 31:
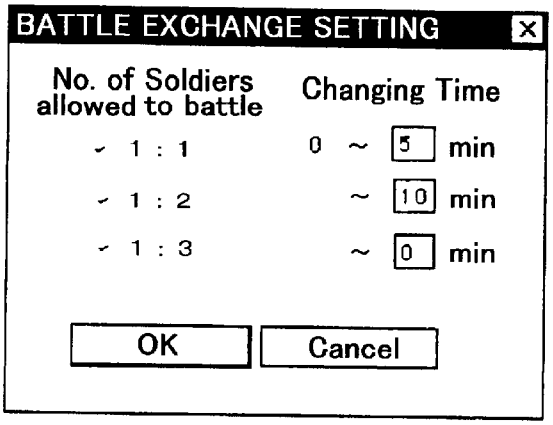
FIG. 31 is a dialog screen for the engagement setting data displayed on the TV monitor.
Figure 32:
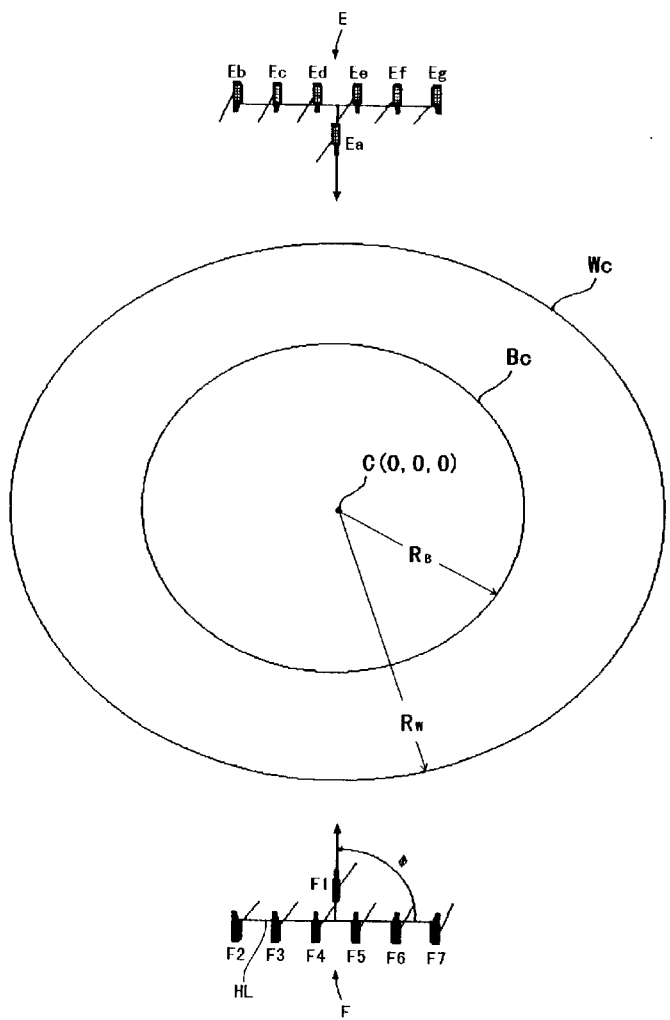
FIG. 32 is a drawing explaining the fall-in positions of both armies displayed on the TV monitor.

In the next step 408, it is determined whether or not the current battle flag BF is 1:1 (see FIG. 31). In this embodiment, there is an battle flag BF for indicating the battle conditions, and this battle flag takes on the value 1:1, 1:2 or 1:3. When it is determined that the battle flag BF is 1:1, then in the next step 410, it is determined whether or not there is/are (an) enemy(ies) whose status flag is the enemy-search (wandering enemy-search or circling enemy-search) on the basis of the enemy-search detection data, and when the determination is affirmative, then in the next step 412, for the case of the example shown in FIG. 41C, the enemy horse soldier Ec, that is the closest detected enemy, is obtained, and it is determined whether or not another friendly horse soldier has locked on to the enemy horse solder Ec by referencing the locked section of the lock data for the enemy horse soldier Ec and determining whether or not it is 'null'. In step 412 when it is determined that no other friendly horse soldier has locked on to the enemy horse soldier Ec, then the battle flag BF is 1:1, and there are no other friendly horse soldiers that have locked on to the enemy horse soldier Ec, so the process advances to step 432 in order to lock on to the enemy horse soldier. Here, the meaning of 'lock' is to identify the enemy horse soldier as a battle opponent, and the ID data for the enemy horse soldier is entered in the locking section of one's own lock data, and one's own ID data is entered into the locked section of the lock data of that enemy horse soldier. When it is determined in step 410 that there is no detected enemy horse soldier, or when it is detected in step 412 that another friendly horse soldier has locked on to the enemy horse soldier Ec, then the enemy-search sub-routine ends, and the process returns to step 452 in FIG. 10.

On the other hand, when it is determined in step 408 that the status of the battle flag BF is not 1:1, then 1:2 or 1:3 battle is allowed, so in the next step 414, it is determined whether or not the battle flag BF is 1:2. When it is determined in step 414 that the battle flag BF is 1:2, then in step 416, it is determined whether or not there is/are (an) enemy (ies) whose status is enemy-search based on enemy-search detection data similar to step 410. In step 416, when the determination is affirmative, then in the next step 418, the ID data for the closest detected enemy Ec (enemy Ec in the example shown in FIG. 41C) is obtained, and by referencing the locking section of all the friendly horse soldiers' lock data, it is determined whether or not the closest enemy is locked onto by two friendly horse soldiers. When it is determined in step 418 that the enemy is not locked onto by two friendly horse soldiers, then the battle flag BF is 1:2 and no friendly horse soldiers have locked onto the enemy, or only one friendly horse soldier has locked onto the enemy horse soldier, so the process advances to step 432 in order to lock onto that enemy horse soldier. However, when the determination in step 416 is negative, then instep 420, it is determined whether or not there is/are (an) enemy(ies) whose status flag is battle, and when the determination is affirmative, then in the next step 422, the enemy list of the closest enemy and the locking section of the friendly horse soldiers' lock data are referenced in order to determine whether the closest enemy whose flag is battle (enemy horse soldier Ea in the example shown in FIG. 41C) is engaged in battle with another two friendly horse soldiers, or whether the closest enemy is engaged in battle with one friendly horse soldier and locked onto by another friendly horse soldier, or whether or not two other friendly horse soldiers have locked onto the closest enemy. Here, the enemy list is a list of data that specify the enemy soldier in the object horse soldier's battle area BA for whom the object horse soldier stopped, and whom it is trying to battle with (see FIGS. 42A, 42B). When it is determined in step 422 that none of the conditions are met, then it is possible for the object horse soldier to exchange battle with the closest enemy under conditions which allow 1:2 battle with the enemy, so the process advances to step 432 in order to lock on to that enemy horse soldier. However, when it is determined in step 418 that the closest enemy is locked onto by two friendly horse soldiers, or when it is determined in step 420 that there is no enemy engaged in battle in the enemy-search detection data, or when it is determined in step 422 that one of the conditions is satisfied, then the enemy-search sub-routine ends and the process advances to step 452 in FIG. 10.

When it is determined in step 414 that the battle flag BF is not 1:2, then 1:3 battle is allowed, so in the next step 424, it is determined whether or not there is/are (a) detected enemy(ies) based on the enemy-search detection data similar to as done in step 410. When it is determined in step 424 that (an) enemy(ies) has/have been detected, then in the next step 426, ID data for the closest detected enemy is obtained, and it is determined whether or not the closest detected enemy is locked onto by three friendly horse soldiers, by referencing the locking section of all friendly soldiers' lock data. When it is determined in step 426 that the closest enemy horse soldier is not locked onto by three friendly horse soldiers, then the battle flag BF is 1:3, and no other friendly horse soldiers have locked on to the enemy horse soldier, or only one or two horse soldiers have locked onto the enemy horse soldier, so the process advances to step 432 in order to lock onto that enemy. When it is determined in step 424 that there is no detected enemy, then in step 428, it is determined whether or not there is/are (an) enemy(ies) in the enemy-search detection data that is/are engaged in battle, and when the determination is affirmative, then in the next step 430, the enemy list of the closest enemies and the locking section of the friendly soldiers' lock data are referenced in order to determine whether the closest enemy whose status flag is 'Battle' is engaged in battle with other three friendly horse soldiers, or whether the closest enemy is engaged in battle with one other friendly horse soldier and locked onto by two different friendly horse soldiers, or whether the closest enemy is engaged in battle with two other friendly horse soldiers and locked onto by one different friendly horse soldier, or whether or not three other friendly horse soldiers have locked onto the closest enemy. When it is determined in step 430 that none of the conditions are met, then it is possible for the object horse soldier to exchange battle with the closest enemy under conditions which allow 1:3 battle with the enemy, so the process advances to step 432 in order to lock on to that enemy horse soldier. However, when it is determined in step 426 that the closest enemy is locked onto by two friendly horse soldiers, or when it is determined in step 428 that there is no enemy engaged in battle in the enemy-search detection data, or when it is determined in step 430 that one of the conditions is satisfied, then the enemy-search sub-routine ends and the process advances to step 452 in FIG. 10.

After locking onto the enemy horse soldier in step 440, the status flag FL of the object horse soldier is set to approach in step 442, and in the next step 444 a counter qn is set to 0. The enemy-search sub-routine then ends and the process advances to step 460 in FIG. 10.

In step 432, it is determined whether or not there is ID data of an enemy horse soldier in the locked section of the lock data, and that ID data is the ID data of an enemy horse soldier to lock (see FIG. 40E). When it is determined that there is no ID data of an enemy horse soldier, then the process advances to step 440, however when it is determined that there is ID data of an enemy and that it is the ID data to lock, then there is an obstacle (corpse of a dead horse soldier, or enemy and friendly horse soldiers engaged in battle) between the object horse soldier and the enemy horse soldier to be locked, so the status flags of both are set from approach to wandering enemy search (or circling enemy search) and the approach status is cleared. Therefore, it is seen that there is still an obstacle between the two, and in step 434, a clear counter jn is increased by an increment of 1, and in the next step 436, it is determined whether or not the clear counter jn is 120. When it is determined that the clear counter is not 120, then the enemy-search sub-routine ends and the process advances to step 452 is FIG. 10 (or step 472 in FIG. 12). However, when it is determined that the clear counter is 120, then in step 438, the ID data for the enemy horse soldier in the clear section of the lock data for the object horse soldier is cleared. In the next step 440, since there is no ID data in the clear section, that enemy horse soldier is locked (see FIG. 40D). In step 440, when it was determined in step 402 that the object horse soldier has been locked by the enemy, then as shown in FIGS. 40A, 40B for example, the ID data Eb for the enemy horse soldier that locked onto the horse soldier is deleted from the locked section of the lock data for horse soldier F2 and the locked section become 'null', and that data Eb is then entered in the locking section as data for identifying the enemy horse soldier that the object horse soldier locked on to itself. Next, in step 442, the status flag FL for the object horse soldier is set to approach, the counter qn is set to 0, the enemy-search sub-routine ends, and the process advances to step 460 in FIG. 10 (or step 478 in FIG. 12).

Figure 43:
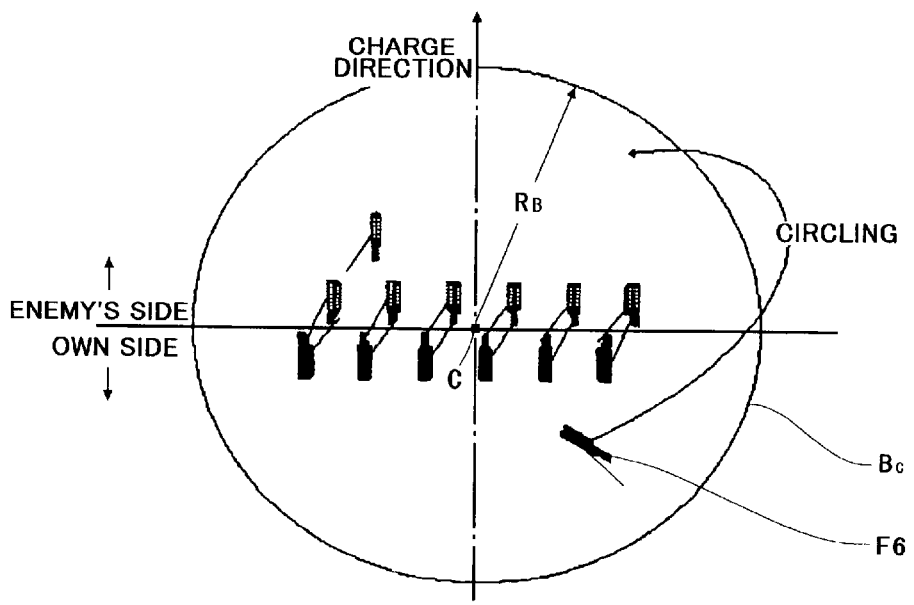
FIG. 43 is a drawing explaining the conditions for the object horse soldier to change from wandering enemy search to circling enemy search.

In step 452 in FIG. 10, it is determined whether or not the previous position of the object horse soldier that was read in step 404 is in one's own side. As shown in FIG. 43, the battlefield circle Bc is divided into two areas by a horizontal line (or plane) that runs through the center C. The side for the horse soldiers of army F is the area below the line in FIG. 43, and the enemy side is the area above the line. In step 452, when it is determined that the previous position of the object horse soldier is on its own side, then in the next step 454, it is determined whether or not the direction of the object horse soldier is in the direction toward its own side (see horse soldier F6 in FIG. 43), by referencing the components of the direction vector of the object horse soldier. When it is determined that the object horse soldier is facing toward its own side, then in the next step 456, the status flag FL of the object horse soldier is set to circling enemy search, and the value of the cleared counter jn is taken to be 100, and then in step 458, the circling direction of the object horse soldier is determined and the result is stored in RAM and the process advances to step 460. When deciding this circling direction, when the object horse soldier is on the left side of a vertical line (or plane) that runs through the center of the battlefield and divides the battlefield circle in the vertical direction, then the circling direction is taken to be clockwise when the direction vector of the object horse soldier is less than 45 degrees with respect to the horizontal line, and it is taken to be counterclockwise when the direction vector is greater than 45 degrees. On the other hand, when the object horse soldier is on the right side of a vertical line (or plane) that runs through the center of the battlefield and divides the battlefield circle in the vertical direction, then the circling direction is taken to be counterclockwise when the direction vector of the object horse soldier is less than 45 degrees with respect to the horizontal line (for horse soldier F6 in FIG. 43), and it is taken to be clockwise when the direction vector is greater than 45 degrees. However, when it is determined in step 452 or step 454 that the object horse soldier is not on its own side or does not face toward its own side, then the process advances to step 460 in order to continue wandering enemy search.

In the next step 460, the close-range acceleration, described above, is computed, and in the next step 462 the wandering acceleration is computed. When computing the wandering acceleration, first, the previous position of the object horse soldier is read, and it is determined whether or not the object horse soldier is within the wandering area Wc. When it is determined that the object horse soldier is within the wandering area Wc, then the previous direction vector is read, and the wandering acceleration is computed using the above-mentioned Equation (3). Here, the wandering area Wc, is the area inside a circle (or sphere) with the center being the center C of the battlefield circle and having a radius that is 1.5 times the battlefield radius $R_B$. On the other hand, when it is determined that the object horse soldier is outside of the wandering area Wc, then the wandering acceleration for the object horse soldier to move at maximum velocity in the direction of the wandering reference point, that was set for the object horse soldier in step 117, and to enter the wandering area Wc is computed. In this calculation of the wandering acceleration, the direction vector from the previous position of the object horse soldier to the wandering reference point is calculated, and then the acceleration is computed using Equation (4) below.

Acceleration $(x,y,z)$={(Current direction vector of horse soldier $(x,y,z)$×Maximum velocity)−Current velocity $(x,y,z)$}/Velocity-equalizing time parameter (4)

In this way, the horse soldiers wander at a relatively slow velocity inside the wandering area while searching for the enemy, and when a horse soldier goes outside the wandering area Wc, it returns at maximum velocity in the direction of the wandering reference point that was set for it in step 117 and re-enters the wandering area Wc.

In the next step 464, the close-range acceleration, that was found in step 460, and the wandering acceleration, that was found in step 462, are read, and the x, y and z components are added to find the total acceleration, then the most recent velocity and position is calculated using the Euler method (the direction vector is also calculated and stored in RAM) and the wandering enemy-search process sub-routine ends and the process advances to step 182 in FIG. 6.

<Circling Enemy-search Process Sub-routine>

Figure 12:
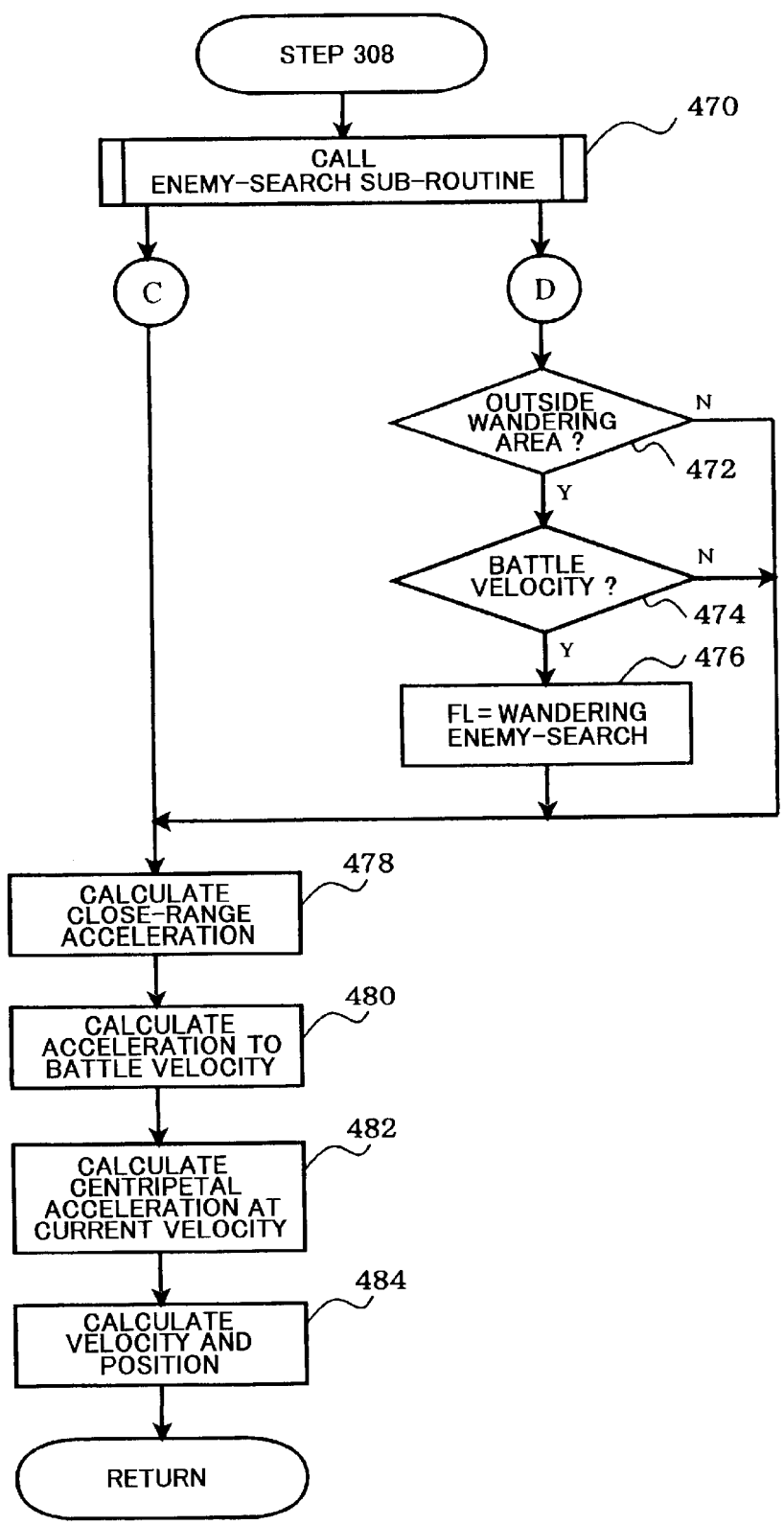
FIG. 12 is a flowchart showing the details of the circling enemy-search process sub-routine of step 308 of the battlefield process sub-routine.

In the circling enemy-search process sub-routing of step 308 in FIG. 9, in step 470, as shown in FIG. 12, the enemy-search sub-routine in FIG. 11 described above is called up. In FIG. 12, the connecting points C and D are connected to the respective connecting points C and D in FIG. 11.

In the next step 472, it is determined whether or not the object horse soldier is outside the wandering area Wc, and when it is determined that the object horse soldier is outside the wandering area, then in step 474, it is determined whether or not the previous velocity of the object horse soldier has reached the battle velocity. When it is determined that the previous velocity has reached the battle velocity, then in the next step 476, the status flag FL of the object horse soldier is taken to be wandering enemy search and the process advances to step 478. On the other hand, when it is'determined in step 472 that the object horse soldier is not outside:the wandering area Wc and in step 474 that the velocity has not reached the battle velocity, then circling enemy search continues and the process advances to step 478.

Figure 45:
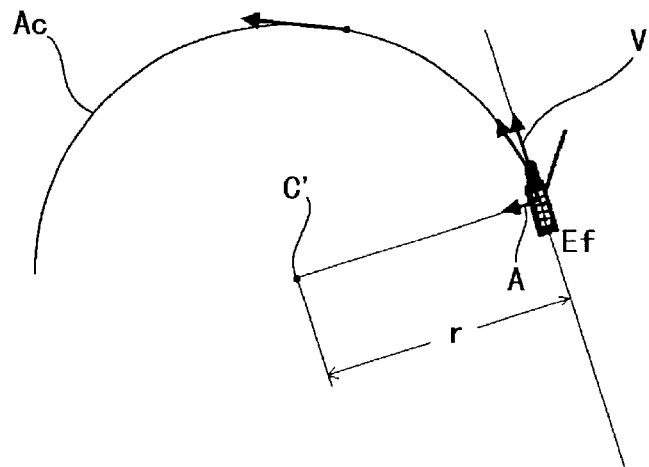
FIG. 45 is a drawing explaining the centripetal acceleration when the status flag for the object horse soldier is circling enemy search.

In step 478, the close-range acceleration, described above, is computed, and in the next step 480, the acceleration needed to bring the previous velocity to the battle velocity is computed. Next, in step 482, the centripetal acceleration A for circling at the current velocity is computed. In explaining this centripetal acceleration A with the use of FIG. 45, when the position vector of the object horse soldier with respect to the center of circling C' is taken to be r, the velocity vector of the object horse soldier is taken to be V, and the angular velocity is taken to be ω, then the centripetal vector A can be found from Equation (5) below.

$$A = -r\omega^2 \quad (5)$$

The velocity vector V is the outer product of the position vector r and angular velocity ω, so when the scalar for the position vector r is given, for example, ½ the battlefield radius $R_B$, then the angular velocity ω can be found, since the position and velocity vectors of the object horse soldier are already known. By substituting this angular velocity ω into Equation (5), it is possible to find the centripetal vector A.

In the next step 484, the x, y and z components of the close-range acceleration calculated in step 478, the acceleration to match the battle velocity calculated in step 480, and the centripetal acceleration A calculated in step 482 are added together to find the total acceleration, then the most recent velocity and position are found using Euler's method (also the direction vector is calculated and stored in RAM), after which the wandering enemy-search process sub-routine ends and the process advances to step 182 in FIG. 6. By doing this, the object horse soldier changes position and moves every ⅟60 seconds along the track of the circle Ac shown in FIG. 45.

Figure 44:
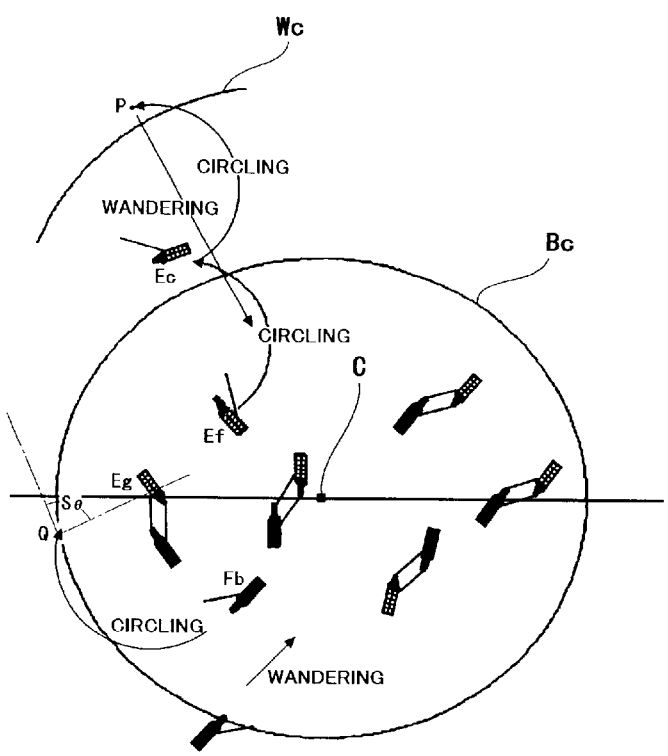
FIG. 44 is a drawing explaining the conditions for the object horse soldier to change from circling enemy search to wandering enemy search or approach.

Here, the wandering enemy search and circling enemy search will be explained in further detail with the use of FIG. 44. For example, when the status flag FL for the horse soldier Ef is wandering enemy search, it is on its own side and in the direction to return toward its own side, so the status flag FL is set to circling enemy search, the circling direction is set and the velocity and position are calculated (steps 452 to 464 in FIG. 10). Since the horse soldier Ef is in the wandering area, the status flag FL continues to be circling enemy search (step 472 in FIG. 12), and the position of the horse soldier changes and moves every 1/60 seconds along the track of the circle Ac with its center being the center of circling C' (steps 478 to 484 in FIG. 12). When the horse soldier Ef comes near the horse soldier Ec, which is not moving and whose status flag FL=Dead, then the horse soldier Ec is deemed as an obstacle and the repulsive force is effected onto the object horse soldier Ef (FIG. 37 and step 478 in FIG. 12), the position of the center of circling C' moves in order to maintain circling at the current velocity (step 482 in FIG. 12). At this time, when the horse soldier Ec is not an obstacle, the horse soldier Ef turns along the track of the circling circle Ac, changing its position every 1/60 seconds until an enemy horse soldier enters its enemy-search area SA. The horse soldier Ef, that turns while the position of the center of circling C' changes, goes outside the wandering area Wc at point P as shown in FIG. 44, and when the velocity at point P has reached the battle velocity, it is taken to be that the horse soldier has gone too far away from the battlefield, so the status flag FL of the horse soldier becomes wandering enemy search (step 476 in FIG. 12), the circling status is maintained (steps 478 to 484 in FIG. 12), then and after the next 1/60 seconds it faces the wandering reference point that was set for the horse soldier Ef (step 117 in FIG. 4) and wanders in searching for the enemy. When the object horse soldier is searching for an enemy, there are two modes of movement; wandering and circling. On the other hand, in the case of the horse soldier Fb shown in FIG. 44, a friendly horse soldier and an'enemy horse soldier Eg engaged in battle enter the enemy-search area SA at point Q, so when the status of the battle flag is 1:2 or 1:3, the horse soldier locks onto the enemy horse soldier Eg, and the status flag FL becomes approach (steps 440, 442 in FIG. 11), so the circling enemy search stops and the horse soldier approaches the enemy horse soldier Eg.

<Approach Process Sub-routine>

Figure 13:
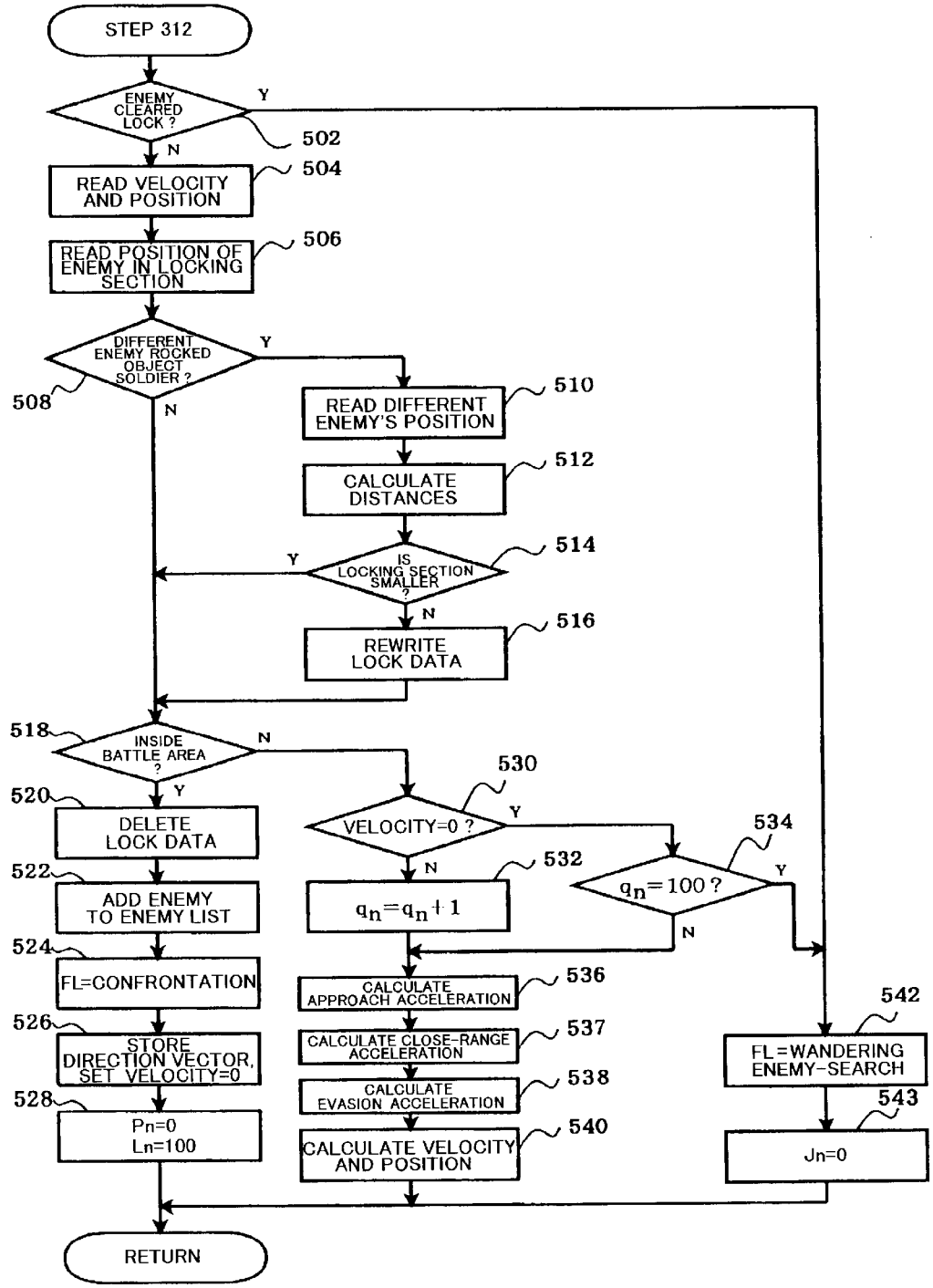
FIG. 13 is a flowchart showing the details of the approach process sub-routine of step 312 of the battlefield process sub-routine.

In the approach process sub-routine of step 312 in FIG. 9, as shown in FIG. 13, first, in step 502, by referencing the clear section of the lock data, it is determined whether or not the lock on the object horse soldier by the enemy horse soldier has been cleared. (see FIG. 40E). In this way, when a horse soldier with approach status clears the lock, there is a possibility that a dead horse soldier could become an obstacle between the object horse soldier and the locked enemy horse soldier making it impossible to approach. When it is determined that the lock has been cleared, then the process advances to step 542, however when it is determined that the lock has not been cleared, then in the next step 504, the previous velocity and position are read. Next, in step 506, the previous position of the enemy that is in the locking section of the lock data is read, and in the next step 508, by referencing the locked section of the lock data, it is determined whether or not (a) different enemy (ies) has/have locked onto the object horse soldier. It goes without saying, that when battle flag is 1:1, that a different enemy will not lock onto the object horse soldier (step 412 in FIG. 11).

When it is determined in step 508 that a different enemy horse soldier has locked onto the object horse soldier, then in step 510, the previous position of the enemy horse soldier, that is entered in the locked section of the lock data of the object horse soldier, is read, and in step 512, the distances between the enemies entered in the locking section and locked section and the object horse soldier are computed. Next, in step 514, it is determined whether or not the distance from the enemy horse soldier entered in the locking section of the lock data is small (short). When the distance is small, then the process advances to step 518 in order to engage in battle with the enemy horse soldier entered in the locking section. However, when it is determined that the distance is not small, then in step 516, since it is only possible for the object horse soldier to approach one enemy horse soldier, the data in the locked section of the lock data of the object horse soldier is deleted in order to approach the enemy horse soldier entered in the locked section, and the data in the locking section identifying the enemy horse soldier, is rewritten with a different enemy horse soldier from the previously locked enemy horse soldier, and the data in the locking section of the lock data of the enemy horse soldier is deleted and the data identifying the object horse soldier is entered in the clear section.

In the next step 518, it is determined whether or not the previous position of the object horse soldier and the previous position of the enemy horse soldier are inside the battle area BA. When it is determined that the positions are inside the battle area BA, then in the next step 520, all of the lock data (locked section, locking section, and clear section) are deleted, and in step 522, the enemy horse soldier to be engaged in battle is added to the enemy list of the object horse soldier (see FIG. 42A). In step 524, the status flag of the object horse soldier is set to confrontation. Next, in step 526, the previous direction vector is stored in RAM, and after the direction that the object horse soldier is facing is stored, in order avoid colliding with the enemy horse soldier and in order to engage in battle with the enemy horse soldier, the velocity of the object horse soldier is set to 0, and in the next step 528, the attack point Pn, that indicates the attack strength of the object horse soldier, is set to 0, and the life point Ln, that indicates the life strength, is set to 100. The approach process sub-routine then ends and the process advances to step 182 in FIG. 6.

On the other hand, when it is determined in step 518 that the positions are not inside the battle area BA, then in the next step 530, it is determined whether or not the previous velocity of the object horse soldier was 0, and when it is determined that it wasn't 0, then in step 532, the counter qn is increased by an increment of 1, and the process advances to step 536. However, when it is determined that the previous velocity was 0, then in step 534 it is determined whether or not the counter qn is 100. When it is determined in step 534 that the counter qn is 100, or in other words, when the object horse soldier does not move for 100/60 seconds, then it is taken to mean that there is an obstacle such as the dead corpse of a horse soldier in front of the object horse soldier in 3-dimensional virtual space. In step 542, the status flag FL of the object horse soldier is set to wandering enemy search, then in the next step 543, the clear counter Jn is set to 0 and the ID data for the object horse soldier is entered in the clear section of the lock data of the enemy horse soldier. The approach process sub-routine then ends and the process advances to step 182 in FIG. 6. In this way, during a specified time (120/60=2 seconds; see horse soldier and the enemy horse soldier, approaching as an enemy is stopped.

Figure 48:
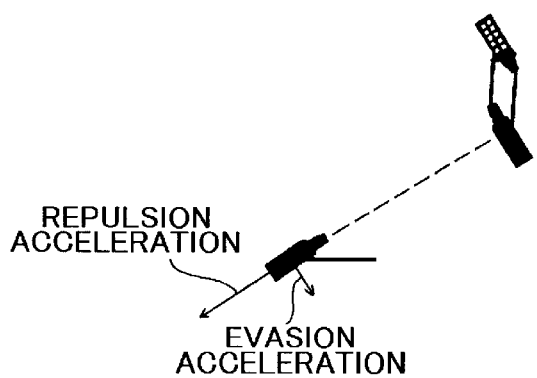
FIG. 48 is a drawing explaining the evasion acceleration.

When it is determined in step 534 that the counter qn is not 100, then in step 536, the approach acceleration is calculated such that the velocity is gradually reduced when coming close to the enemy horse soldier, and becomes 0 when the distance from the enemy horse soldier is within the battle radius BR. In this embodiment, the position of the enemy horse soldier as well as the position and velocity of the object horse soldier are read, and by calculating the distance from the enemy horse soldier, the approach acceleration for reducing the velocity is calculated when the distance between the object horse soldier and the enemy horse soldier is within 10 meters, and the approach acceleration is 0 when the distance is greater than 10 meters. Next, in step 537, the close-range acceleration is calculated in order to evade contact with another horse soldier, and in the next step 538, the evasion acceleration is calculated. When calculating this evasion acceleration, the object horse soldier stops, and in order to evade contact with a friendly horse soldier that is engaged in battle with an enemy horse soldier, it is determined whether or not there is a friendly horse soldier within the close-range perception radius of the object horse soldier, and when it is determined that there is a friendly horse soldier within that radius, then as shown in FIG. 37, the repulsion acceleration from the friendly horse soldier is calculated (when there is more than one friendly horse soldier the total close-range acceleration is calculated), and as shown in FIG. 48, the evasion acceleration, which is a vector component in the direction orthogonal to the repulsion acceleration, is calculated in order to evade collision with a friendly horse soldier. However, when there is no friendly horse soldier within that radius, then the evasion acceleration is 0. Next, in step 540, after finding the total acceleration, which is a sum of the approach acceleration, close-range acceleration and evasion acceleration that were calculated in steps 536 to 538, the most recent velocity and position are calculated, then the approach process sub-routine ends and the process advances to step 182 in FIG. 6. In this way, the object horse soldier gradually approaches the locked enemy horse soldier, slows down when the distance in the 3-dimensional virtual space from the enemy horse soldier is within 10 meters, and when there is a friendly horse soldier engaged in battle with the enemy horse soldier within the close-range perception radius of the object horse solder, the object horse soldier avoids collision with the friendly horse soldier and approaches the enemy horse soldier.

<Confrontation Process Sub-routine>

Figure 14:
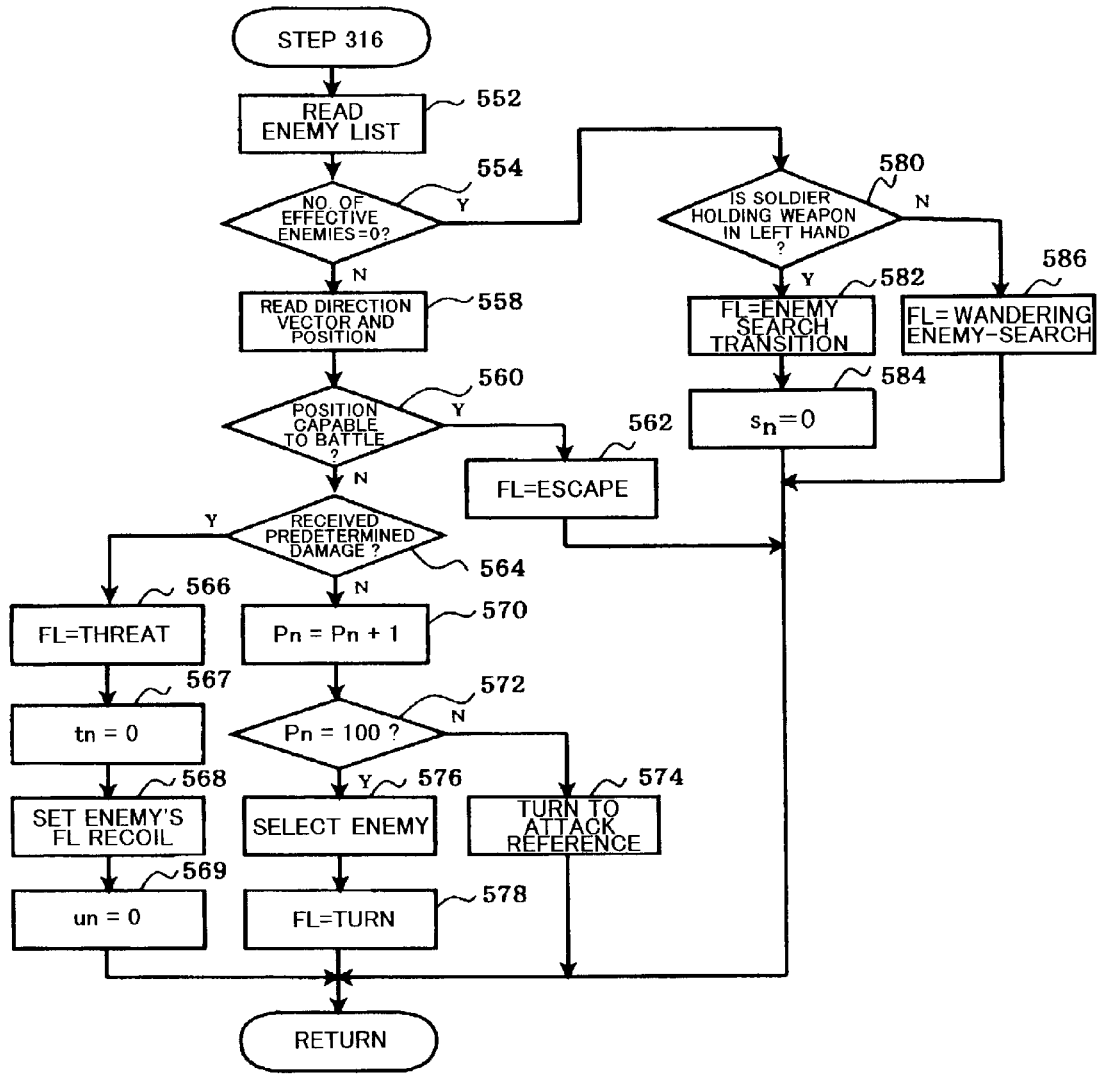
FIG. 14 is a flowchart showing the details of the confrontation process sub-routine of step 316 of the battlefield process sub-routine.

In the confrontation process sub-routine in FIG. 9, as shown in FIG. 14, first, in step 552, the enemy data entered in the enemy list is read, then in the next step 554, the status flag of the enemy horse soldier is reference to determine whether or not the number of effective enemies is 0. In other words, as described later, when the status flag of the enemy horse soldier is fall, for example, that enemy horse soldier will die after that, so even when the status flag of the object horse soldier is confrontation, there is no need to attack that enemy horse soldier quickly, so it is deleted from the number of effective enemies. In step 554, when it is determined that the number of enemies is 0, then there are no enemy horse soldiers in the battle area Bc that should be engaged in battle, then in step 580 it is determined whether or not the object horse soldier is holding a weapon such as a spear or sword in its left hand. When it is determined that the object horse soldier is holding a weapon in its left hand, then in step 582, the status flag FL is set to enemy-search transition, and in step 584, the enemy-search transition counter sn is set to 0. The confrontation process sub-routine then ends and the process advances to step 182 in FIG. 6. When it is determined that the object horse soldier is not holding a weapon in its left hand, then in step 586, the status flag FL of the object horse soldier is set to wandering enemy search. The confrontation process sub-routine then ends and the process advances to step 182 in FIG. 6.

On the other hand, when it is determined in step 554 that the number of effective enemies is not 0, then in the next step 558, the direction vector data for the object horse soldier that was stored in step 526, and the position of the object horse soldier and the position of an enemy horse soldier from among all of the enemy horse soldiers within the battle radius BR of the object horse soldier that is entered in the enemy list as an enemy of the object horse soldier are read, then after adding data for specifying the enemy horse soldier from among all of the enemy horse soldiers within the battle radius BR of the object horse soldier that is entered in the enemy list as an enemy of the object horse soldier (see FIG. 42B), in the next step 560, it is determined whether or not the enemy horse soldier is in a position where the object horse soldier is not able to react (outside the battle area). In other words, the battle area BA of the object horse soldier within the battle radius BR of the object horse soldier is restricted to the default value of 170 degrees, so it is determined whether or not there is an enemy horse soldier in the enemy list as an enemy to the object horse soldier that is outside this battle area BA. When it is determined in step 560 that there is an enemy outside the battle area BA, then in the next step 562, the object horse soldier regards that enemy as an enemy that it cannot respond to, and the status flag FL of the object horse soldier is set to escape. The confrontation process sub-routine then ends and the process advances to step 182.

On the other hand, when it is determined in step 560 that there is no enemy outside the battle area BA, then in the next step 564, it is determined whether or not the object horse soldier has received more than a predetermined amount of damage from battling with the same enemy horse soldier. In this embodiment, this predetermined amount of damage is defined as the damage on the object horse soldier whose life point Ln becomes 30 or less. When it is determined in step 564 that more than the set amount of damage has been received, then in the next step 566, the status flag of the object horse soldier is set to threat, and in step 567 the threat counter tn for the object horse soldier is set to 0. In the next step 568, the status flag FL of the enemy horse soldier, that damaged the object horse soldier more than the predetermined amount, is set to recoil, and in the next step 569, the recoil counter un of that enemy horse soldier is set to 0. The confrontation process sub-routine then ends and the process advances to step 182.

Figure 46A:
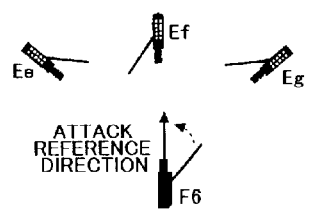
FIG. 46A shows the reference attack direction.

When it is determined in step 564 that the damage received is not more than the set amount, then in the next step 570, the number of attack points Pn of the object horse soldier is increased by an increment of 1. In the next step 572, it is determined whether or not the number of attack points Pn is 100, and when it is determined that the number of points is not 100, then in step 574, the object horse soldier turns in the attack reference direction. The confrontation process sub-routine then ends and the process advances to step 182. Here, the attack reference direction is the direction in which the object horse soldier can turn a minimum amount and be able to attack all of the enemies listed in the enemy list. For example, as shown in FIG. 46A, since the battle angle is 170 degrees, to turn a minimum amount from the direction of the object horse soldier F6 that was read in step 558 in a direction such that it is possible to attack all of the enemy horse soldiers Ef, Ee and Eg, the object horse soldier turns 1.5 deg/sec (maximum angular velocity in FIG. 30) every 1/60 seconds until the angle with the enemy horse soldier Ee is 87.5 degrees, or ½ the battle angle $B_\theta$. On the other hand, when it is determined in step 572 that the number of points is 100, then in the next step 576, the enemy horse soldier with the fewest number of life points Ln is selected and stored in memory, and then in step 578, the status flag FL of the object horse soldier is set to turn. The confrontation process sub-routine then ends and the process advances to step 182.

<Turn Process Sub-routine>

Figure 46B:
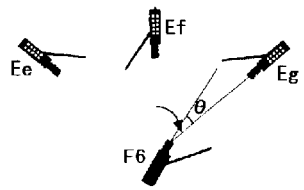
FIG. 46B shows the circling direction before attack.

In the turn process sub-routine of step 320 in FIG. 9, as shown in FIG. 15, first, in step 602, it is determined whether or not the position of the enemy horse soldier to be attacked (for example, the enemy horse soldier with the fewest number of life points) is within the attack angle. When it is determined that the position of the enemy horse soldier is not within the attack angle, then in step 604 the object horse soldier turns until the enemy horse soldier is inside the attack angle. When doing this, for example as shown in FIG. 46B, the object horse soldier F6 rotates an angle θ (for example 20 degrees) so that it is not on the same line as the enemy horse soldier Eg it is trying to attack, but a little off in order that it is easier to battle. On the other hand, when it is determined that the enemy horse soldier is within the attack angle, the object horse soldier stops its rotating at the θ degree offset angle against the enemy horse soldier in step 606, then in the next step 608, it is determined whether or not it is necessary to change the weapon to the other hand. The object horse soldier is considered to be right handed, so when there is only one enemy horse soldier to exchange battle with, the weapon is held in the right hand and the right side faces toward the enemy horse soldier. However, when there are two or more enemy horse soldiers to battle, the object horse soldier holds the weapon in the hand that enables it to face the weapon at the enemy by turning in just a small angle (see enemy horse soldier Ee in FIG. 46B).

When it is determined in step 608 that it is necessary to change the weapon to the other hand, then in the next step 610, the status flag FL of the object horse soldier is set to weapon hand change, and in step 612, the weapon hand change counter rn of the object horse soldier is set to 0. The turn process sub-routine then ends and the process advances to step 182. On the other hand, when it is determined in step 608 that it is not necessary to change the weapon to the other hand, then in step 614, the status flag FL of the object horse soldier is set to attack and the attack number 'an' is set in step 616. This attack number 'an' is a random number and takes a value 1, 2 or 3. In the next step 618, the attack counter hn is set to 0, then the turn process sub-routine ends and the process advances to step 182.

<Weapon Hand Change Process Sub-routine>

In the weapon hand change process sub-routine of step 324 in FIG. 9, as shown in FIG. 16, first, in step 632 the image processing unit 23 is instructed to perform the process to create an image of the weapon hand change motion of the object horse soldier. By doing this, the operation for the object horse soldier to change the weapon to the other hand is shown on TV monitor every ¹⁄₆₀ seconds. Next, in step 634, the time required for changing the weapon to the other hand is 1.5 seconds, and it is determined whether or not the weapon hand change counter rn is 90. When it is determined that the counter is not 90, then in step 640, in order to continue the weapon hand change motion, the weapon hand change counter is increased by an increment of 1. When it is determined that the weapon hand change counter is 90, then in step 636, the status flag FL of the object horse soldier is set to attack, and in the next step 638, the attack number 'an' is set the same as was done in step 616, and the attack counter hn is set to 0. The weapon hand change process sub-routine ends and the process advances to step 182.

<Enemy-search Change Process Sub-routine>

Figure 17:
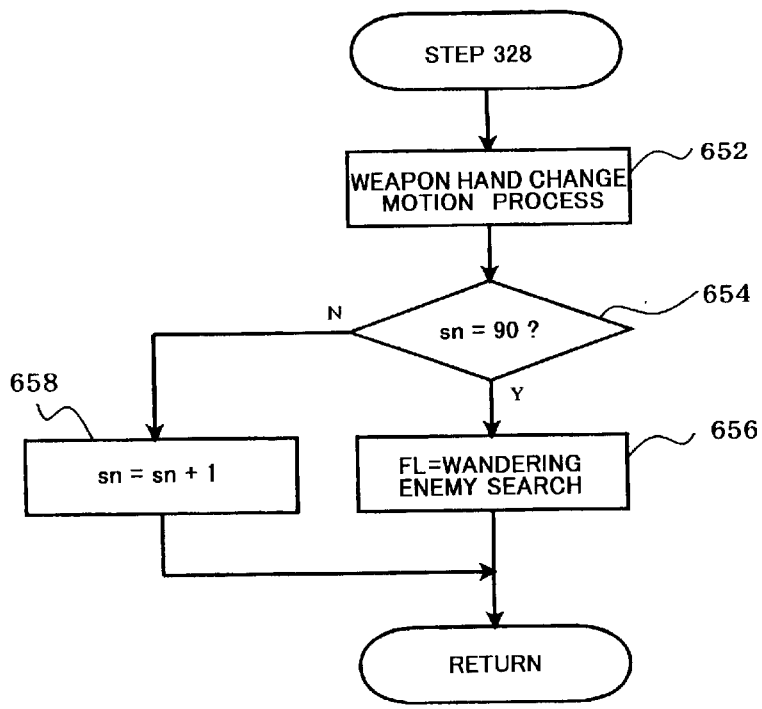
FIG. 17 is a flowchart showing the details of the enemy-search transition process sub-routine of step 328 of the battlefield process sub-routine.

In the enemy-search change process sub-routine of step 328 in FIG. 9, as shown in FIG. 17, first, in step 652, the image processing unit 23 is instructed to perform the process to create an image of the weapon hand change motion of the object horse soldier, as was done in step 632. In other words, the enemy-search change is a step to change to the wandering enemy search, and before changing to wandering enemy search, the weapon must be held in the right hand. In the next step 654, it is determined whether or not the enemy-search change counter sn is 90, and when it is not 90, then in step 658, in order to continue the weapon hand change motion, the enemy-search change counter sn is increased by an increment of 1. However, when it is determined that the enemy-search change counter sn is 90, then in step 656, the status flag FL of the object horse soldier is set to wandering enemy search. The enemy-search change process sub-routine then ends and the process advances to step 182.

<Threat Process Sub-routine>

Figure 18:
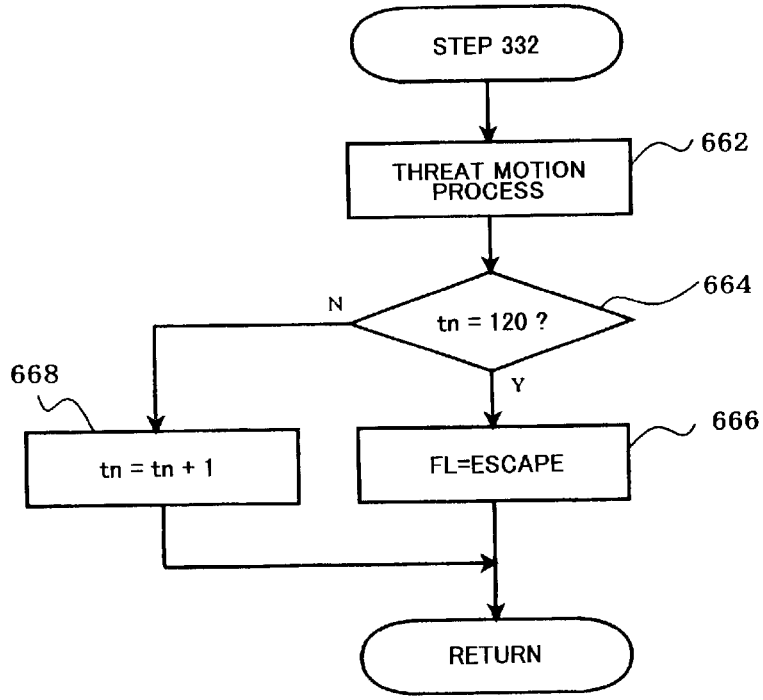
FIG. 18 is a flowchart showing the details of the threat process sub-routine of step 332 of the battlefield process sub-routine.

In the threat process sub-routine of step 332 in FIG. 9, as shown in FIG. 18, first in step 662, the image processing unit 23 is instructed to create an image of the threat motion toward the enemy horse soldier of the object horse soldier. In other words, the start of the threat process sub-routine, when a set amount of damage or more is received from the same enemy horse soldier (see step 566 in FIG. 14), is the step before the object horse soldier escapes, and the enemy horse soldier that received the threat from the object horse soldier always recoils back. In the next step 664, it is determined whether or not the threat counter tn is 120, and when it is determined that it is not 120, then in step 668, in order to continue the threat motion, the threat counter tn is increased by an increment of 1. The threat process sub-routine then ends and the process advances to step 182. However when it is determined that the threat counter is 120, then in step 666, the status flag FL of the object horse soldier is set to escape, and the enemy list data of the object horse soldier and the enemy list data of the enemy horse soldier that is engaged in battle and that is not the threatened enemy horse soldier are deleted. The threat process sub-routine then ends and the process advances to step 182.

<Recoil Process Sub-routine>

Figure 19:
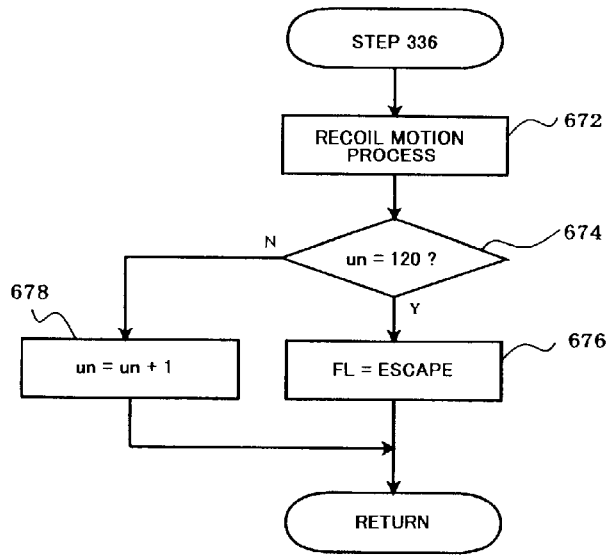
FIG. 19 is a flowchart showing the details of the recoil process sub-routine of step 336 of the battlefield process sub-routine.

In the recoil process sub-routine of step 336 in FIG. 9, as shown in FIG. 19, first, in step 672 the image processing unit 23 is instructed to create an image of the threat motion of the object horse soldier. Next, in step 674, it is determined whether or not the recoil counter un is 120, and when it is not 120, in step 678, in order to continue the recoil motion, the recoil counter un is increased by an increment of 1. The recoil process sub-routine then ends and the process advances to step 182. However, when it is determined that the recoil counter is 120, then in step 676, the status flag FL of the object horse soldier is set to escape, and the data in the enemy list of the object horse soldier is deleted. The recoil process sub-routine then ends and the process advances to step 182.

<Escape Process Sub-routine>

Figure 20:
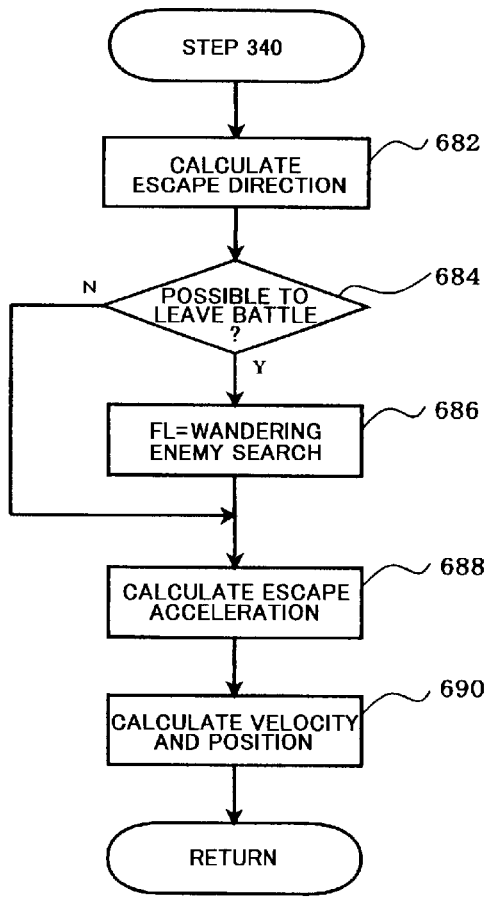
FIG. 20 is a flowchart showing the details of the escape process sub-routine of step 340 of the battlefield process sub-routine.
Figure 46C:
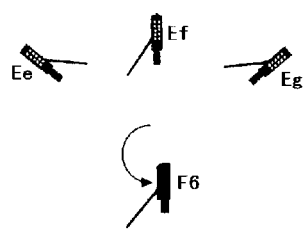
FIG. 46C is a drawing explaining the withdraw direction.

In the escape process sub-routine of step 340 in FIG. 9, as shown in FIG. 20, first, in step 682, the escape direction vector Ve, which is the escape direction for which the unit vector has been changed such that is in the opposite direction of the attack reference direction, is calculated (see FIG. 46C), then in step 684, it is determined whether or not it is possible to leave the battle by determining whether or not the velocity scalar (absolute value of the velocity vector) in the escape direction of the object horse soldier is 1.0 m/sec. When it is determined that it is not possible to leave the battle, then the process advances to step 688, however when it is determined that it is possible to leave the battle, then the status flag FL of the object horse soldier is set to wandering enemy search, and when there is data specifying an enemy horse soldier in the enemy list of the object horse soldier, and when the is data specifying the object horse soldier in the enemy list of the enemy horse soldier, then those data are deleted from the enemy lists, and the process advances to step 688.

In step 688, in order to leave the battlefield, the escape acceleration Ae is calculated using Equation (6) below. In Equation (6), 5 (m/sec^2) is a fixed value.

$$\text{Escape acceleration } Ae = \text{Escape direction vector } Ve \times 5 \text{ (m/sec}^2\text{)} \quad (6)$$

Next, in step 690, the most recent velocity and most recent position is calculated using Euler's method. The escape process sub-routine then ends and the process advances to step 182.

<Attack Process Sub-routine>

Figure 21:
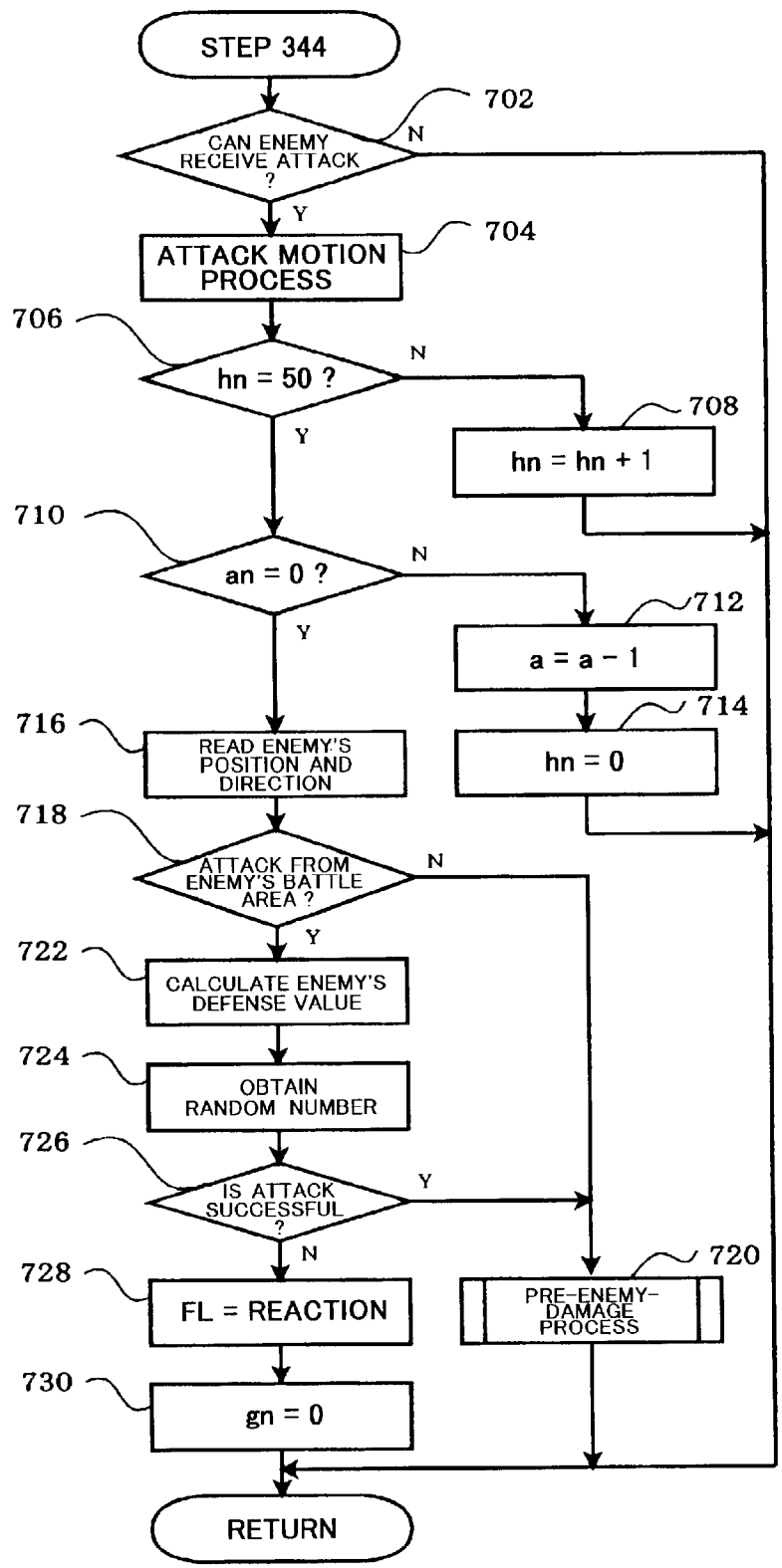
FIG. 21 is a flowchart showing the details of the attack process sub-routine of step 344 of the battlefield process sub-routine.

In the attack process sub-routine of step 344 in FIG. 9, as shown in FIG. 21, first, in step 702, it is determined whether or not the enemy horse solider is in the state to receive an attack from the object horse soldier (the status flag FL is confrontation, turn, damage, attack, or defense) instead of being in the middle of a motion process, such as weapon hand change motion, and when it is determined that the enemy horse soldier is not in that state, then the attack process sub-routine ends and the process advances to step 182. However, when it is determined that the enemy horse soldier is in such a state, then in the next step 704, the image processing unit 23 is instructed to create an image of attach motion of the object horse soldier, and in step 706, it is determined whether or not the attack counter hn is 50. When it is determined that the attack counter hn is not 50, then in step 708, the attack counter hn is increased by an increment of 1. The attack process sub-routine then ends and the process advances to step 182. When it is determined that the attack counter is 50, then in step 710, it is determined whether or not the attack number 'an' is 0. When it is determined in step 710 that the attack number an is not 0, then in step 712, the attack number an is decreased by 1, and in the next step 714, the attack counter hn is set to 0. The attack process sub-routine then ends and the process advances to step 182.

When it is determined in step 710 that the attack number an is 0, then the attack by the object horse soldier has ended, so in the next step 716, the position and direction of the enemy horse soldier and the position of the object horse soldier are read, and in step 718, it is determined whether or not the object horse soldier attacked the enemy horse soldier from inside the battle area BA of the enemy horse soldier. When a negative determination is made, then the enemy horse solder cannot defend against the attack from the object horse soldier, and the attack from the object horse soldier must be considered to have been successful, and the process advances to step 720.

However, when it is determined in step 718 that there was an attack, then the enemy horse soldier is able to defend against the attack from the object horse soldier, so in the next step 722, the defense value, which indicates the defense strength of the enemy horse soldier, is calculated. In this calculation of the defense value, the damage flag dfn of the enemy horse soldier, the status flag FL and the life point Ln are read, and when the damage flag dfn of the enemy horse soldier is 0 and the status flag FL is defense, then the defense coefficient d is taken to be 1.5, when the damage flag dfn of the enemy horse soldier is 1, the defense coefficient d is taken to be 0.5, and for other values, the defense coefficient d is taken to be 1, and the defense value of the enemy horse soldier is calculated using Equation (7) below.

$$\text{Defense value} = \text{Defense coefficient } d \times \text{Life point } Ln \quad (7)$$

Next, in step 724, a random number in the range 0 to 99 is obtained, and in step 726, by determining whether or not the random number is greater than the defense value, it is determined whether or not the attack from the object horse soldier was successful. When it is determined that the attack was successful, then the process advances to step 720, and the pre-enemy-damage process is executed for decreasing the life point Ln of the enemy horse soldier.

Figure 22:
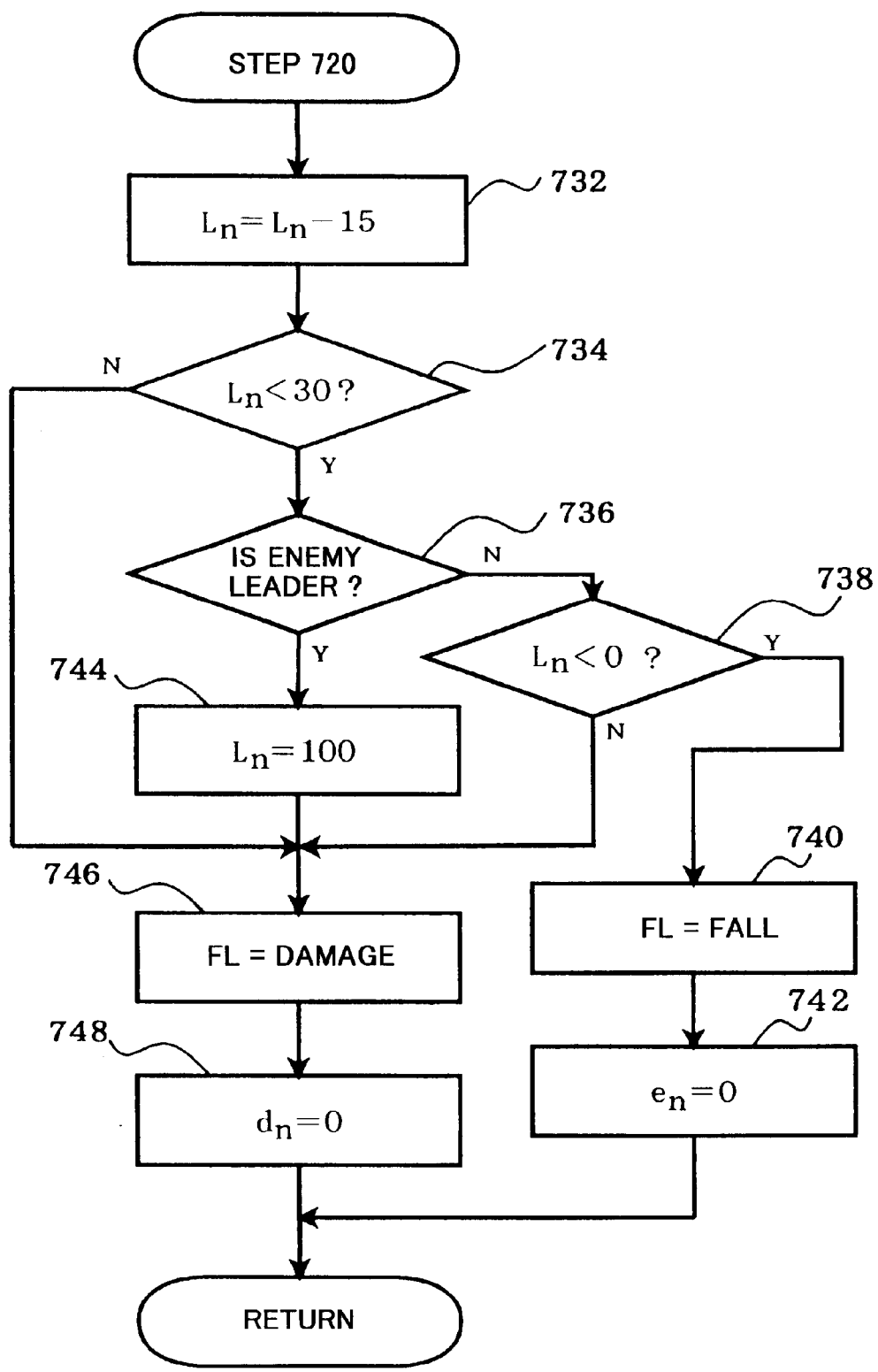
FIG. 22 is a flowchart showing the details of the pre enemy-damage process sub-routine of step 720 of the attack process sub-routine.

As shown in FIG. 22, in the pre-enemy-damage process, first, in step 732, the life point Ln of the enemy horse soldier is decreased by 15 points, and in the next step 734, it is determined whether or not the life point Ln of the enemy horse soldier is less than 30. When it is determined that the life point Ln is not less than 30, then the process advances to step 746. However, when it is determined that the life point Ln is less than 30, then in the next step 736, it is determined whether or not that enemy horse soldier is the leader of the enemy army. When it is determined in step 736 that the enemy soldier is the leader of the enemy army, then in step 744, the life point Ln of the enemy horse soldier is set to 100 so that the leader does not die. However, when it is determined in step 736 that the enemy horse soldier is not the leader of the enemy army, then in 738 it is determined whether or not the number of life points Ln for that enemy horse soldier is 0 or less, and when it is determined that the number of life points is not 0 or less, then the process advances to step 746. However, when it is determined that the number of life points is 0 or less, then in step 740 the status flag FL of the enemy horse soldier is set to fall, and in the next step 742, the fall counter en is set to 0. The pre-enemy-damage process sub-routine then ends, and the process advances to step 182. In step 746, the status flag FL of the enemy horse soldier is set to damage, and the damage flag dfn of the enemy horse soldier is set to 1, then in the next step 748, the damage counter dn is set to 0. The pre-enemy-damage process sub-routine and attack sub-routine end, and the process advances to step 182.

On the other hand, when it is determined in step 726 in FIG. 21 that the random number is not greater than the defense value, then step 728, the status flag FL of the object horse soldier is set to reaction, and in the next step 730 the reaction counter gn is set to 0. The attack process sub-routine then ends and the process advances to step 182.

Damage Process Sub-routine>

Figure 23:
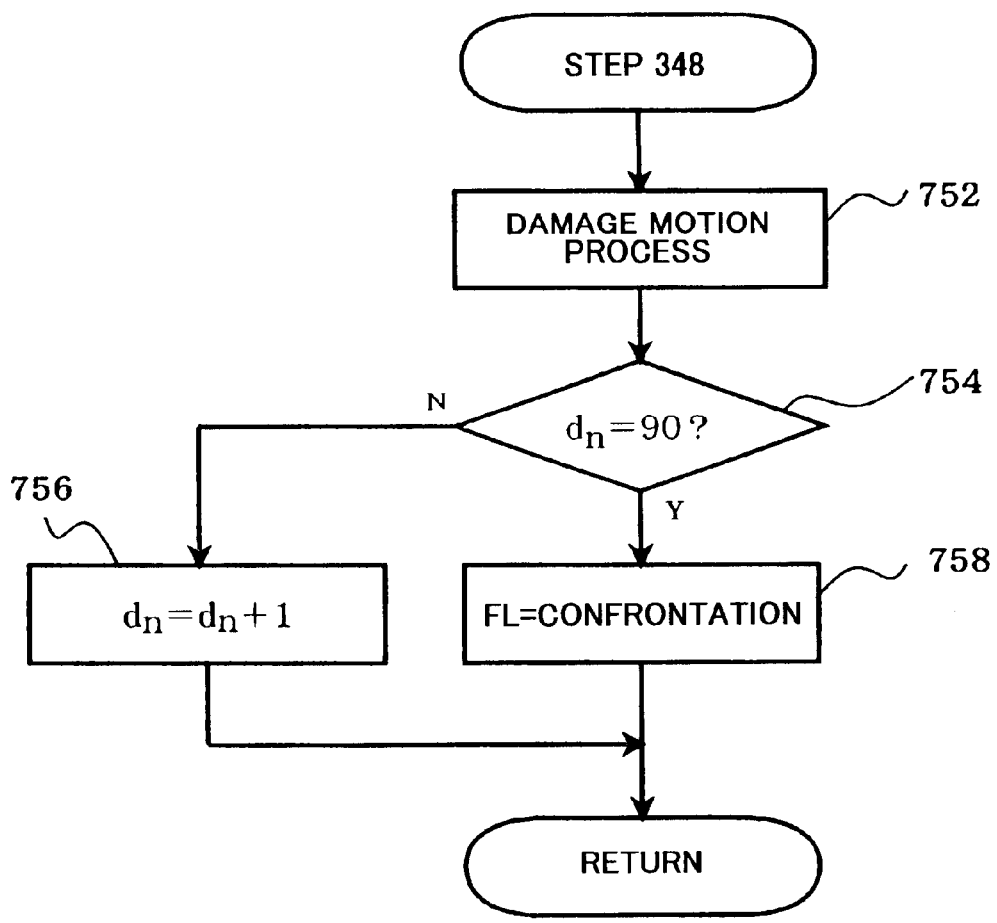
FIG. 23 is a flowchart showing the details of the damage process sub-routine of step 348 of the battlefield process sub-routine.

In the damage process sub-routine of step 348 in FIG. 9, as shown in FIG. 23, first, in step 752, the image processing unit 23 is instructed to create an image of the damage motion of the object horse soldier. By doing this, the status of the object horse soldier that has received damage from an enemy horse soldier is output to the TV monitor 4 every ¹⁄₆₀ seconds. Next, in step 754, it is determined whether or not the damage counter dn is 90, and when it is determined that the damage counter dn is not 90, in step 756, in order to continue the damage motion, the damage counter dn is increased by an increment of 1. The damage process sub-routine then ends and the process advances to step 182. However, when it is determined that the damage counter dn is 90, then in step 758, the status flag FL of the object horse soldier is set to confrontation. The damage process sub-routine then ends and the process advances to step 182.

<Fall Process Sub-routine>

Figure 24:
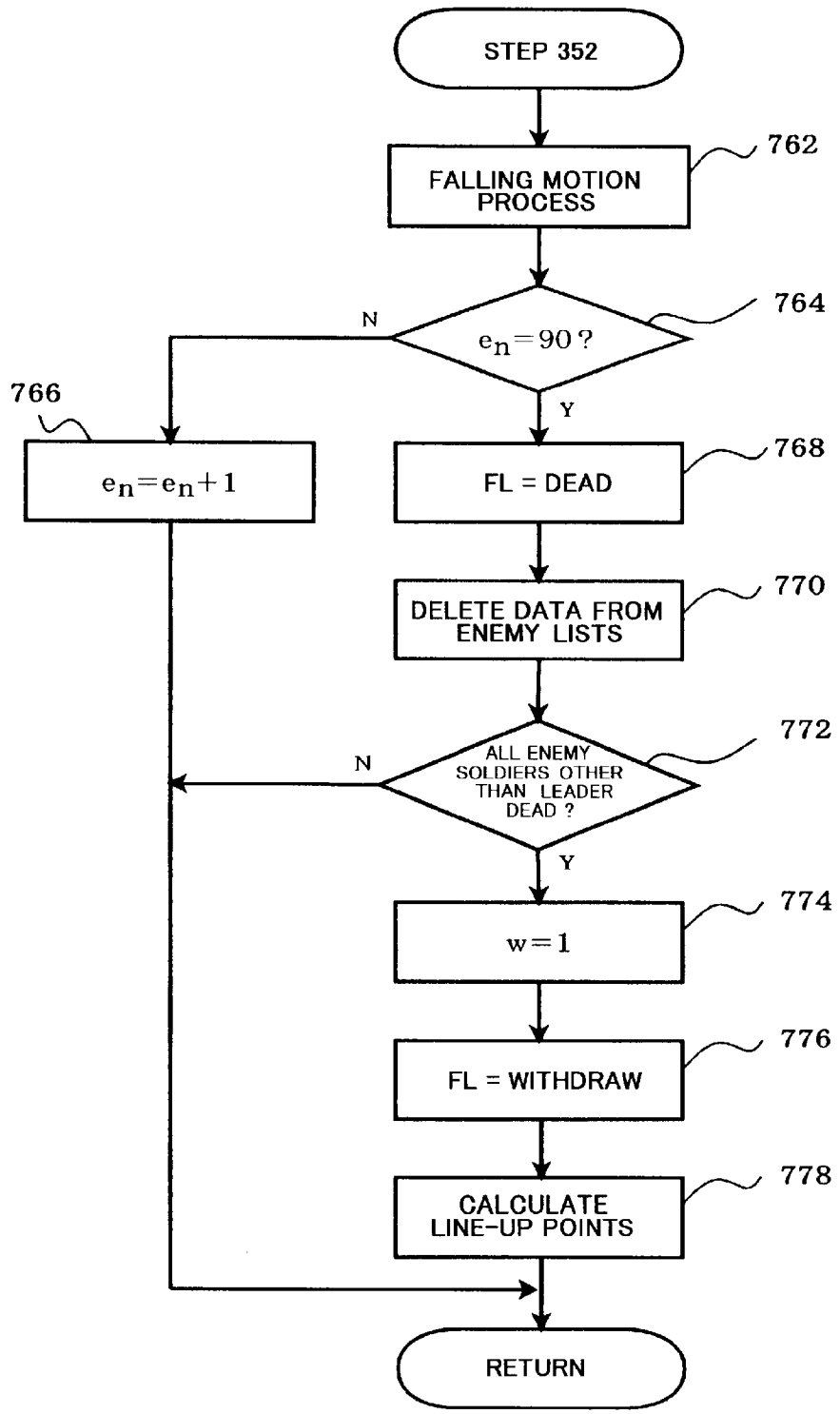
FIG. 24 is a flowchart showing the details of the fall process sub-routine of step 352 of the battlefield process sub-routine.

In the fall process sub-routine of step 352 in FIG. 9, as shown in FIG. 24, first, in step 762, the image processing unit 23 is instructed to create an image of the falling motion of the object horse soldier falling from its horse, then in the next step 764, it is determined whether or not the fall counter en is 90. When it is determined that the fall counter en is not 90, then in step 766 the fall counter en is increased by an increment of 1. The fall process sub-routine then ends and the process advances to step 182. However, when it is determined that the fall counter is 90, then in step 768, the status flag FL of the object horse soldier is set to dead, and in the next step 770, data related to is object horse soldier is deleted from the enemy lists of the enemy horse soldier, that was an enemy of the object horse soldier, and the object horse soldier. The horse soldier, whose status flag was set to dead, and its horse can no longer move. In the next step 772, it is determined whether or not the status flags FL of all of the horse soldiers other than the leader of the enemy army are dead, and when it is determined that they are not all dead, then in order to continue battle, the fall process sub-routine ends and the process advances to step 182. However, when it is determined that the status flags of all of the enemy horse soldiers are dead, then in step 774 the win flag w is set to 1, and in the next step 776, the status flags FL of all of the horse soldiers of both armies, except for those horse soldiers whose status flags are dead, are set to withdraw, and in step 778, the line-up points for the horse soldiers of both armies, whose status flags are withdraw, are calculated (see FIG. 47). The fall process sub-routine then ends and the process advances to step 182.

<Reaction Process Sub-routine>

Figure 25:
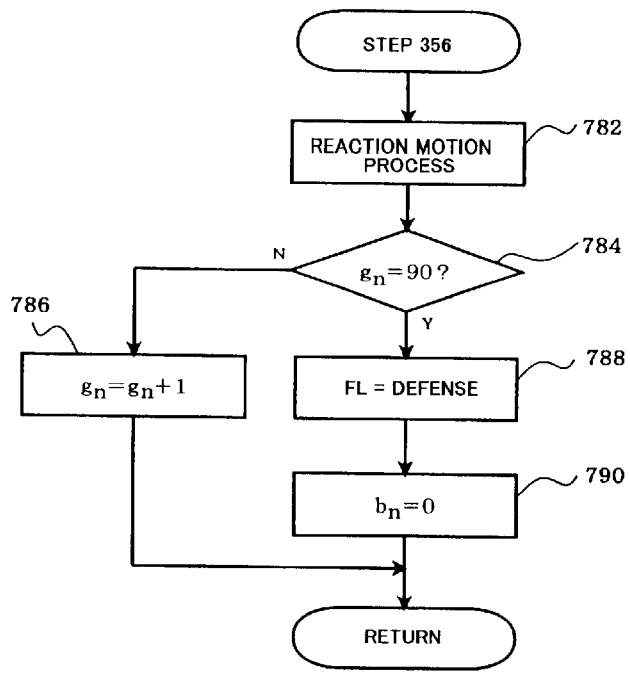
FIG. 25 is a flowchart showing the details of the reaction process sub-routine of step 356 of the battlefield process sub-routine.

In the reaction process sub-routine of step 356 in FIG. 9, as shown in FIG. 25, first, instep 782, the image processing unit 23 is instructed to create an image of the reaction motion when the enemy horse soldier receives and defends against an attack from the object horse soldier. In the next step, 784, it is determined whether or not the reaction counter gn is 90, and when it is determined that it is not 90, then in step 786, in order to continue the reaction motion, the reaction counter is increased by an increment of 1. The reaction process sub-routine then ends and the process advances to step 182. However, when it is determined that the reaction counter is 90, then in step 788, the status flag FL of the object horse soldier is set to defense, and in the next step 790, the defense counter bn is set to 0. The reaction process sub-routine then ends and the process advances to step 182.

<Defense Process Sub-routine>

Figure 26:
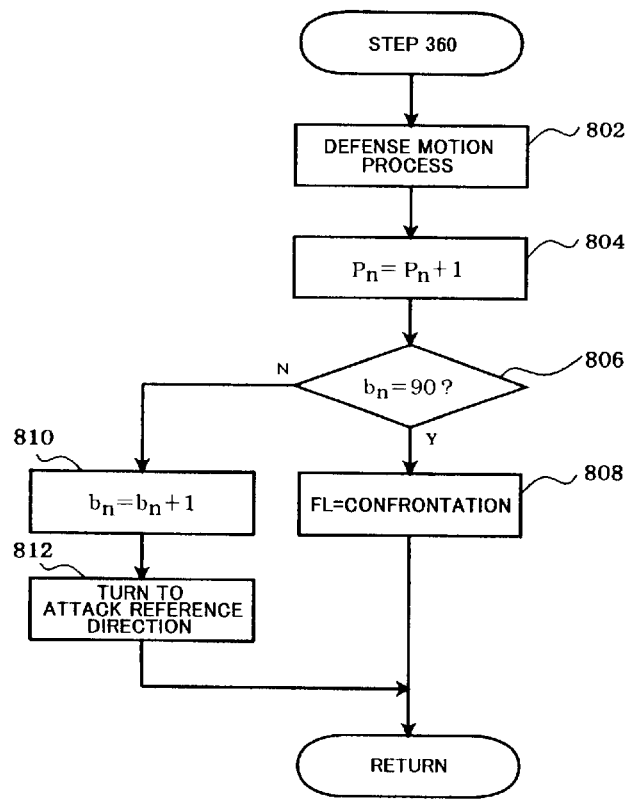
FIG. 26 is a flowchart showing the details of the defense process sub-routine of step 360 of the battlefield process sub-routine.

In the defense process sub-routine of step 360 in FIG. 9, as shown in FIG. 26, first, in step 802, the image processing unit 23 is instructed to create an image of the defense motion for defending against an attack from the enemy horse soldier. Next, in step 804, the number of attack points Pn is increased by an increment of 1, then in step 806 it is determined whether or not the defense counter bn is 90, and when it is determined that it is not 90, then in step 810, in order to continue the defense motion, the defense counter bn is increased by an increment of 1, and in the next step 812, the object horse soldier turns at a rate of 1.5 deg/sec every $\frac{1}{60}$ seconds until it faces in the attack reference direction. The defense process sub-routine then ends and the process advances to step 182. On the other hand, when it is determined in step 806 that the defense counter is 90, in the next step 808, the status flag FL is set to confrontation. The defense process sub-routine then ends and the process advances to step 182.

<Dead Process Sub-routine>

Figure 27:
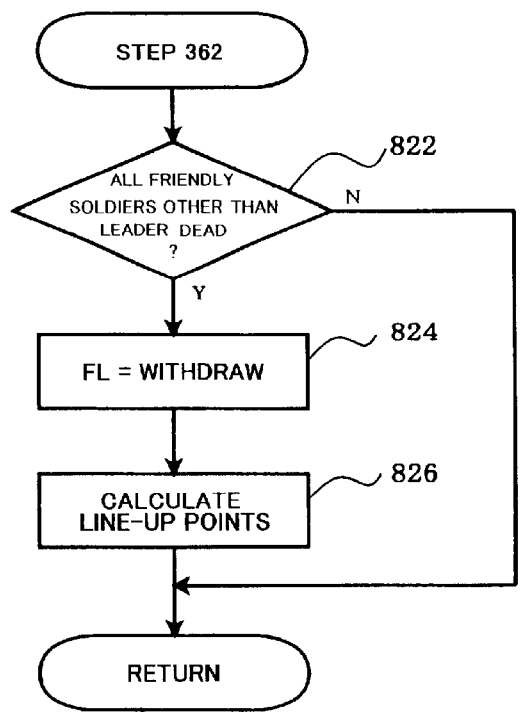
FIG. 27 is a flowchart showing the details of the dead process sub-routine of step 362 of the battlefield process sub-routine.

In the dead process sub-routine of step 362 in FIG. 9, as shown in FIG. 27, in step 822, it is determined whether or not the status flags FL of all of the horse soldiers, except the leader, of the friendly army are dead, and when it is determined that they are not all dead, then in order to continue battle, the dead process sub-routines ends and the process advances to step 182. However, when it is determined that all of the status flags FL are dead, then in step 824, the status flags of all of the horse soldiers of both armies, except for the horse soldiers whose status flags are dead, are set to withdraw, and in the next step 826, the line-up points for the horse soldiers of both armies, whose status flags are withdraw, are calculated. The dead process sub-routine then ends and the process advances to step 182.

Figure 47:
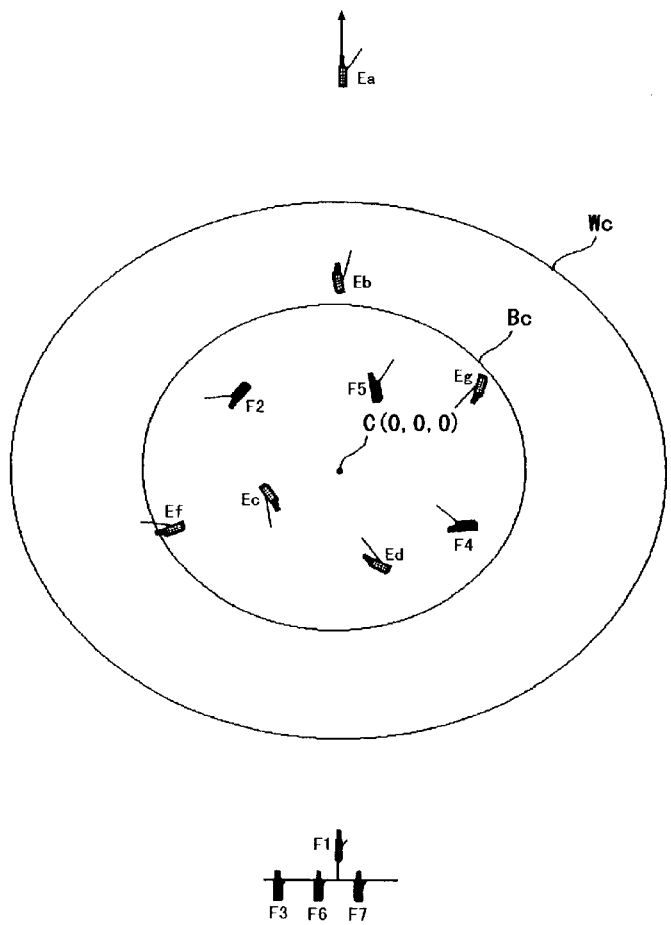
FIG. 47 is a drawing explaining the line-up point when the win flag is 1.

In step 182 in FIG. 6, in order to perform processing for the next horse soldier after the object horse soldier, the number of soldiers n is decreased by 1, and the process returns to step 168. In step 132 in FIG. 4, it is determined whether or not the battle-end flag is ON, and when it is determined that the battle-end flag is not ON, then the process returns to step 120. However, when it is determined that the battle-flag is ON, then in the next step 134, the end process is performed. In this end process, when the win flag w is 1, army F is considered the winner. For example, as shown in FIG. 47, the surviving horse soldiers F1, F3, F6 and F7 of army F at the line-up point, raise their weapons in the air and give a loud victory shout. The leader of army E starts to move from the line-up point in the opposite direction of the attack direction and the enemy-search and battle routine ends. On the other hand, when the win flag w is 0, army E is considered the winner. For example, as shown in FIG. 39, the surviving horse soldiers Ea, Eb, Ed to Eg of army E at the line-up point, raise their weapons in the air and give a loud victory shout. The leader of army F starts to move from the line-up point in the opposite direction of the attack direction and the enemy-search and battle routine ends.

As described above, in this embodiment of the invention, in the enemy-search sub-routine it is determined whether or not there are any enemy horse soldier in the search area SA of the object horse soldier (step 406), and when there is an enemy horse soldier in the search area (steps 410, 416, 428), it is determined whether or not it is possible for the enemy soldier to engage in battle with the object horse soldier (step 412, 422, 418, 430, 426, 432 to 438), and when it is determined that it is possible to engage in battle, the object horse soldier locks onto the enemy horse soldier and identifies that horse soldier as an enemy. The object horse soldier then approaches the enemy horse soldier until the enemy horse soldier is inside the battle area BA of that object horse soldier (step 518), so the horse soldiers of both armies search for enemies within their own enemy-search area SA, and approach the enemy, making it possible for a realistic battle between a group of characters that is similar to an actual group battle. Moreover, in comparison with conventional character-group battle games, in which when the leader took a step forward the other characters followed by one step, this game has more of a realistic feel.

Moreover, in this embodiment, when there is no enemy horse soldier in the enemy-search area SA of the object horse soldier, or when it is not possible to engage in battle with an enemy soldier because it is having a battle with another friendly horse soldier, the object horse soldier changes from wandering enemy search to circling enemy search (step 456), and when the object horse soldier leaves the battlefield, enemy search changes from circling enemy search to wandering enemy search (step 476). The movement mode changes when performing enemy search so it is possible to keep the players interest, and by change the enemy-search movement mode, the enemy-search area SA of the object horse soldier changes to a direction that differs to that in the previous movement mode, so the player does not become impatient while searching for an enemy (until there is a match).

Furthermore, in this embodiment, determining whether or not it is possible for the enemy horse soldier to engage in battle with the object horse soldier is done with an battle flag BF that can be set by the player (steps 408, 414), so a character-group battle game with a realistic feel similar to an actual battle is possible. In addition, in this embodiment, it is possible to determine whether or not it is possible to engage in battle with the enemy horse soldier before approaching the enemy horse soldier (steps 440, 442) so this is similar to a real horse soldier looking for an enemy horse soldier inside its own field of view and engaging in battle, this makes it possible to better satisfy the player's desire for a realistic experience, than by determining whether or not it is possible to engage in battle after approaching the enemy horse soldier.

Also, in this embodiment, when there is an obstacle, such as the dead corpse of a horse soldier, between the object horse soldier and enemy horse soldier that prevents them from getting close to each other, the approach status is canceled and the mode changes to the wandering enemy search mode in order to search for another enemy horse soldier (steps 534, 542), so it is possible to prevent the problem that existed in prior games of the player losing interest when a friendly soldier can no longer move when it comes in contact with another character or obstacle, and when the other characters cannot move forward.

Furthermore, in this embodiment, after approaching the enemy horse soldier until it is inside the battle area BA, the object horse soldier stops and the direction of the object horse soldier is changed so that it is capable of battling with the enemy horse soldier (steps 578, FIG. 46B), so it is possible to create a battle atmosphere that is similar to an actual battle with a horse soldier, and thus it is possible for the player to enjoy a realistic battle through modern images that are comparable to film.

Moreover, when the object horse soldier receives more than a certain amount of damage from the enemy horse soldier, and when the location of the object horse soldier with respect to the enemy horse soldier is a location where the enemy horse soldier cannot battle with the object horse soldier, the object horse soldier escapes away from the enemy horse soldier (steps 562 to 567), so the player is able to enjoy a battle that is similar to an actual battle. In addition, when the number of life points drops below a certain value, damage is received and the defense strength is also reduced (steps 722, 746), therefore, it is possible to express the drop in defense strength of a horse soldier that has been injured in battle. Also, when the object horse soldier escapes after receiving more than a set amount of damage from the same enemy horse soldier, and then threatens the enemy horse soldier (step 566) so it is possible to skillfully simulate the psychology of an actual horse soldier.

In this embodiment, the medium 1 on which the game program is recorded, is read with a medium reading unit 22 and the program is transferred to RAM, however, it is possible to store the game program in ROM with out the use of the medium reading unit 22, and then read the game program from ROM. By doing that, it is possible to have a exclusive game machine. Also, for this embodiment, an example of using an CD-ROM as the recording medium was explained, however, the invention may also be applied to a ROM cartridge, large-capacity floppy disk, magneto-optical disk or the like whose contents can be loaded to the RAM of the CPU block 20 when the appropriate medium reading unit is equipped with the main game unit 2.

Moreover, in this embodiment, initial settings are set using a dialog, however in the actual game, for example, the initial setting can be set automatically by using the input device 3 to move the cursor displayed on the screen and specifying the line-up positions from where to begin movement of the horse soldiers. Also, it is possible to automatically perform all initial settings according to the advancement of the game.

Furthermore, in this embodiment, the acceleration and position of the horse soldiers are calculated in the vertical blanking interrupt processing, however it is possible perform these calculations in timer interrupt processing or main processing.

Also, in this embodiment, wandering movement and circling movement were given as examples of the movement modes of the horse soldiers, however this invention is not limited to these, for example, it is also possible to use other movement modes such as zig-zag, triangular, or rectangular movement. Moreover, in this embodiment, the battle flag BF changed by time, however, it is possible for the battle flag BF to be set randomly when the battle flag BF value becomes necessary, by fetching a random value.

Furthermore, in order for a detailed explanation of this embodiment, the values 90, 100, 120 were used for counters such as the attack counter hn, and 100 was used as that value of the life point Ln, however, this invention is not limited to these values, and it is possible to use other values. Also, it is possible to read the values for these counters from a table or to set them at random. Moreover, in this embodiment, when the object horse soldier charges and it is determined that the charge direction is not forward, then in step 218 the object horse soldier charges toward the battlefield while gradually turning, however, it is also possible to immediately set the status flag FL of the object horse soldier to circling enemy search. By doing so, the object horse soldier moves along the track of the circle Ac and at the point when it reaches the battle velocity, the status flag FL becomes wandering enemy search (see step 476), and it faces toward the battlefield for which the wandering reference point is set.

Also, this embodiment was explained using a 3-dimensional coordinate system, however, by setting the z-axis to 0, it is also possible to apply the invention to a 2-dimensional coordinate system. On the other hand by effectively using the z-axis, the invention can also be applied to character-group battles in outer space between space ships, etc., so it is clear that the invention can be applied to various embodiments that are within the scope of the invention hereinafter claimed.

What is claimed is:

1. A character-group battle method comprising:
   (a) a plurality of characters, that are displayed in a 3-dimensional virtual space, forming groups of friends and enemies wherein each of the characters battles against one another, said method applying a coordinate value calculation step of calculating a coordinate value of each of said plurality of characters that moves based on acceleration in said 3-dimensional virtual space;
   (b) in a first movement mode, an enemy search step of determining whether there is an enemy character of said enemy group within a first area that is predetermined as a range of vision of said character based on the calculated coordinate values, and when a determination is made that there is said enemy character, arranging information for identifying said enemy characters in the first area in the order starting from the enemy character closest to said character and memorizing the information as a list, and a determination is made in the order of said enemy character closest to to said character as to whether predetermined battle conditions that allow one-on-one or one-on-several battles between enemy and friendly characters are satisfied, and when a determination is made that the predetermined battle conditions are satisfied, identifies said enemy character as an enemy that said character should automatically battle with; and (c) an approach step of changing a coordinate value of said character until a coordinate value of said enemy character is inside a second area that is predetermined as a battle range of said character such that said character approaches said enemy character.

2. A character-group battle method of claim 1, wherein when a determination is made in said enemy search step that the predetermined battle conditions are not satisfied, said character moves and searches for enemies in said 3-dimensional virtual space in a second movement mode that differs from the first movement mode in said enemy search step and in which a coordinate value of said character is calculated based on a centripetal acceleration which is calculated by a position vector and an angular velocity with respect to a predetermined center of circling of said character.

3. A character-group battle method of claim 1, wherein when there is an obstacle between said character and said enemy character that prevents said character from approaching said enemy character, said approach step is canceled, and a different enemy character is searched for in said enemy search step.

4. A character-group battle method of claim 1, further comprising a battle step of stopping said character after it has approached said enemy character until said enemy character is inside said second area of said character, and rotating said character a predetermined angle on a line that links coordinate values of said character and said enemy character such that it is capable of battling with said enemy character.

5. A character-group battle method of claim 4, further comprising an escape step of canceling said battle step when said character has received more than a predetermined amount of damage from said enemy character, or when a coordinate value of said character is inside said second area of a different enemy character that said character identifies as an enemy and a coordinate value of said different enemy character is outside said second area of said character, and making said character escape from battle with said enemy character and/or said different enemy character.

6. A character-group battle method of claim 5, wherein said character escapes from battle with said enemy character and/or said different enemy character after threatening said enemy character and/or said different enemy character.

7. A character-group battle method of claim 6, wherein said enemy character and/or said different enemy character recoil by the threatening of said character.

8. A character-group battle method of claim 1, wherein when each of said plurality of characters starts to move and search for enemies in said enemy search steps, a status flag for expressing a current status of said character is set to be an enemy search status and a status flag of said enemy character is listed in said list, and, in said enemy search step, a determination is made as to whether the status flag of said enemy character is set to be the enemy search status based on the list, and when a determination is made that the status flag is set to be the enemy search status, the determination is made in the order of said enemy character closest to said character as to whether the predetermined battle conditions are satisfied.

9. A computer-readable recording medium recording a program for executing:

(a) a performance of a game in which a plurality of characters are displayed in a 3-dimensional virtual space, and the characters form groups of friends and enemies, wherein each of the characters battles against one another, wherein said program executes a coordinate value calculation step of calculating a coordinate value of each of said plurality of characters that moves based on acceleration in said 3-dimensional virtual space;

(b) in a first movement mode, an enemy search step of determining whether there is an enemy character of said enemy group within a first area that is predetermined as a range of vision of said character based on the calculated coordinate values, and when a determination is made that there is said enemy character, arranges information for identifying said enemy character in the first area in the order starting from the enemy character closest to said character and memorize the information as a list, and a determination is made in the order of said enemy character closest to said character as to whether predetermined battle conditions that allow one-on-one or one-on-several battles between enemy and friendly characters are satisfied, and when a determination is made that the predetermined battle conditions are satisfied, identifies said enemy character as an enemy that said character should automatically battle with; and (c) an approach step of changing a coordinate value of said character until a coordinate value of said enemy character is inside a second area that is predetermined as a battle range of said character such that said character approaches said enemy character.

10. A recording medium of claim 9, wherein when a determination is made in said enemy search step that the predetermined battle conditions are not satisfied, said character moves and searches for enemies in said 3-dimensional virtual space in a second movement mode that differs from the first movement mode in said enemy search step and in which a coordinate value of said character is calculated based on a centripetal acceleration which is calculated by a position vector and an angular velocity with respect to a predetermined center of circling of said character.

11. A recording medium of claim 9, wherein when there is an obstacle between said character and said enemy character that prevents said character from approaching said enemy character, said approach step is canceled, and a different enemy character is searched for in said enemy search step.

12. A recording medium of claim 9, further comprising a battle step of stopping said character after it has approached said enemy character until said enemy character is inside said second area of said character, and rotating said character a predetermined angle on a line that links coordinate values of said character and said enemy character such that it is capable of battling with said enemy character.

13. A recording medium of claim 12, further comprising an escape step of canceling said battle step when said character has received more than a predetermined amount of damage from said enemy character, or when a coordinate value of said character is inside said second area of a different enemy character that said character identifies as an enemy and a coordinate value of said different enemy character is outside said second area of said character, and making said character escape from battle with said enemy character and/or said different enemy character.

14. A recording medium of claim 13, wherein said character escapes from battle with said enemy character and/or said different enemy character after threatening said enemy character and/or said different enemy character.

15. A recording medium of claim 14, wherein said enemy character and/or said different enemy character recoil by the threatening of said character.

16. A recording medium of claim 9, wherein when each of said plurality of characters starts to move and search for enemies in said enemy search step, a status flag for expressing a current status of said character is set to be an enemy search status and a status flag of said enemy character is listed in said list, and, in said enemy search step, a determination is made as to whether the status flag of said enemy character is set to be the enemy search status based on the list, and when a determination is made that the status flag is set to be the enemy search status, the determination is made in the order of said enemy character closest to said character as to whether the predetermined battle conditions are satisfied.

17. A game device that is capable of storing in memory a character-group battle program comprising:

(a) the character-group battle program for executing a game in which a plurality of characters, that are displayed in a 3-dimensional virtual space, form groups of friends and enemies wherein each of the characters battles against one another, and the program comprises a coordinate value calculation unit for calculating a coordinate value of each of said plurality of characters that moves based on acceleration in said 3-dimensional virtual space;

(b) an enemy search unit for determining, in a first movement mode, whether there is an enemy character of said enemy group within a first area that is predetermined as a range of vision of said character based on the coordinate values calculated by said coordinate value calculation unit, and when a determination is made that there is said enemy character, arranges information for identifying said enemy character in the first area in the order starting from the enemy character closest to said character and memorizes the information in said memory as a list, and a determination is made in the order of said enemy character next closest to said character as to whether predetermined battle conditions that allow one-on-one or one-on-several battles between enemy and friendly characters are satisfied, and when a predetermination is made that the predetermined battle conditions are satisfied, identifies said enemy character as an enemy that said character should automatically battle with; and (c) an approach unit for changing a coordinate value of said character until a coordinate value of said enemy character is inside a second area that is predetermined as a battle range of said character such that said character approaches said enemy character.

18. A game device of claim 17, wherein when a determination is made by said enemy search unit that the determined battle conditions are not satisfied, said enemy search unit changes to a second movement mode that differs from the first movement mode for said character moving and searching for enemies in said 3-dimensional virtual space and in which a coordinate value of said character is calculated based on a centripetal acceleration which is calculated by a position vector and an angular velocity with respect to a predetermined center of circling of said character.

* * * * *